(12) United States Patent
Zheng et al.

(10) Patent No.: US 11,399,275 B2
(45) Date of Patent: Jul. 26, 2022

(54) USER EQUIPMENT (UE) ASSISTED LOCAL CACHING

(71) Applicant: QUALCOMM Incorporated, San Diego, CA (US)

(72) Inventors: Ruiming Zheng, Beijing (CN); Huichun Liu, Beijing (CN); Xipeng Zhu, San Diego, CA (US); Juan Zhang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/649,007

(22) PCT Filed: Sep. 27, 2018

(86) PCT No.: PCT/CN2018/107823
§ 371 (c)(1),
(2) Date: Mar. 19, 2020

(87) PCT Pub. No.: WO2019/062793
PCT Pub. Date: Apr. 4, 2019

(65) Prior Publication Data
US 2020/0252789 A1 Aug. 6, 2020

(30) Foreign Application Priority Data
Sep. 28, 2017 (WO) ................ PCT/CN2017/103990

(51) Int. Cl.
*H04W 8/24* (2009.01)
*H04L 12/26* (2006.01)
(Continued)

(52) U.S. Cl.
CPC ............ *H04W 8/24* (2013.01); *H04L 43/028* (2013.01); *H04L 67/2857* (2013.01); *H04W 80/02* (2013.01); *H04W 80/08* (2013.01)

(58) Field of Classification Search
CPC ....... H04W 8/24; H04W 80/02; H04W 80/08; H04W 4/02; H04W 4/46; H04W 4/70; H04W 4/00; H04L 43/028; H04L 67/2857
See application file for complete search history.

(56) References Cited

U.S. PATENT DOCUMENTS 9,320,067 B2 4/2016 Ho et al.
2005/0108687 A1 5/2005 Mountain et al.
(Continued)

FOREIGN PATENT DOCUMENTS

CN 102025623 A 4/2011
CN 102611752 A 7/2012
(Continued)

OTHER PUBLICATIONS

International Search Report and Written Opinion—PCT/CN2017/103990—ISA/EPO—dated Jun. 1, 2018.
(Continued)

*Primary Examiner* — Walli Z Butt
*Assistant Examiner* — Shawn D Miller
(74) *Attorney, Agent, or Firm* — Loza & Loza LLP

(57) ABSTRACT

Aspects of the disclosure provide control-plane signaling to support a user equipment (UE)-assisted local caching feature, where information content may be locally cached at or near a base station in a wireless communication network. The control plane signaling may include a system information broadcast (SIB) to advertise availability of the feature; a UE capability message that indicates UE support of the feature; and/or radio resource control (RRC) configuration signaling to configure the UE to utilize the feature. Further aspects describe operation and maintenance (OAM) configuration of a base station to utilize the feature. A base station may additionally check for UE eligibility to utilize the feature, e.g., based on the user's subscription. In further
(Continued)

examples, various enhancements to the user-plane signaling to utilize the UE-assisted local caching feature are provided. Other aspects, embodiments, and features are also claimed and described.

30 Claims, 15 Drawing Sheets

(51) Int. Cl.
*H04L 29/08* (2006.01)
*H04W 80/02* (2009.01)
*H04W 80/08* (2009.01)
*H04L 43/028* (2022.01)
*H04L 67/5683* (2022.01)

(56) References Cited

U.S. PATENT DOCUMENTS

| | | | |
|---|---|---|---|
| 2014/0241446 A1 | 8/2014 | Zhang et al. | |
| 2015/0358809 A1* | 12/2015 | Lau | H04M 7/0072 |
| | | | 455/414.1 |
| 2016/0249232 A1* | 8/2016 | Uchino | H04L 1/1832 |
| 2017/0215099 A1* | 7/2017 | Han | H04W 24/10 |
| 2018/0041897 A1* | 2/2018 | Prasad | H04W 4/50 |
| 2020/0260496 A1* | 8/2020 | Jin | H04W 72/12 |

FOREIGN PATENT DOCUMENTS

| | | |
|---|---|---|
| CN | 103620576 A | 3/2014 |
| CN | 106162756 A | 11/2016 |
| CN | 106657183 A | 5/2017 |
| CN | 106888253 A | 6/2017 |
| WO | 2012088470 | 6/2012 |
| WO | 2016159674 A2 | 10/2016 |
| WO | 2017020270 A1 | 2/2017 |

OTHER PUBLICATIONS

International Search Report and Written Opinion—PCT/CN2018/107823—ISA/EPO—dated Jan. 4, 2019.
CMCC: "Discussion on UE Assisted Local Cache" 3GPP Draft, 3GPP TSG-RAN WG2 Meeting #98, R2-1705797, Discussion on UE Assisted Local Cache, 3rd Generation Partnership Project (3GPP), Mobile Competence Centre, 650, Route Des Lucioles, F-06921 Sophia-Antipolis Cedex, France, vol. Ran WG2, No. Hangzhou, China, May 15, 2017-May 19, 2017, May 14, 2017 (May 14, 2017), XP051276080, 3 Pages, Retrieved from the Internet: URL: http://www.3gpp.org/ftp/Meetings_3GPP_SYNC/RAN2/Docs/. [retrieved on May 14, 2017] the whole document.
CMCC, et al., "Solution to Backhaul Long Latency Issue", 3GPP Draft, 3GPP TSG RAN WG3 #94, R3-162886, Solution to Backhaul Long Latency Issue, 3rd Generation Partnership Project (3GPP), Mobile Competence Centre, 650, Route Des Lucioles, F-06921 Sophia-Antipolis Cedex, France, vol. Ran WG3, No. Reno, Nevada, USA, Nov. 14, 2016-Nov. 18, 2016, Nov. 14, 2016 (Nov. 14, 2016), XP051178985, 6 pages, Retrieved from the Internet: URL: http://www.3gpp.org/ftp/Meetings_3GPP_SYNC/RAN3/Docs/. [retrieved on Nov. 14, 2016] , sec. 2.1,2.2, the whole document.
Qualcomm Incorporated: "Ue Assisted Local Caching", 3GPP Draft, GPP TSG-RAN WG3 Meeting #95bis, R3-171245, Ue Assisted Local Caching, 3rd Generation Partnership Project (3GPP), Mobile Competence Centre, 650, Route Des Lucioles, F-06921 Sophia-Antipolis Cedex, France, vol. RAN WG3, No. Spokane, USA, Apr. 3, 2017-Apr. 7, 2017, Apr. 3, 2017 (Apr. 3, 2017), XP051245955, 6 pages, Retrieved from the Internet: URL: http://www.3gpp.org/ftp/Meetings_3GPP_SYNC/RAN3/Docs/. [retrieved on Apr. 3, 2017] the whole document.
Supplementary European Search Report—EP18863250—Search Authority—Hague—May 4, 2021.
Taiwan Search Report—TW107134357—TIPO—Oct. 12, 2021.

* cited by examiner

USER EQUIPMENT (UE) ASSISTED LOCAL CACHING

CROSS-REFERENCE TO RELATED APPLICATION(S)

This application is the U.S. national stage of PCT patent application number PCT/CN2018/107823 filed on Sep. 27, 2018 which claims priority to and benefit of PCT patent application number PCT/CN2017/103990 filed on Sep. 28, 2017, the content of each of which is incorporated herein by reference.

TECHNICAL FIELD

The technology discussed below relates generally to wireless communication systems, and more particularly, to techniques for reducing backhaul delay in a wireless communication system.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, each of which may be otherwise known as a user equipment (UE).

Local caching (e.g., mobile content delivery networks (CDN), multi-access edge computing (MEC), etc.) are network configurations that may be used to push desired content (e.g., media of various types) to the nodes closest to the requesting users. This is done to reduce the traffic load on the backhaul links of the given network and speed up access times for the requesting users. When the network involves a mobile network, a network may cache content close to an edge router (e.g., a packet gateway (PGW) in an LTE system, a user plane function (UPF) in a 5G or NR system, or a gateway general packet radio service (GPRS) support node (GGSN) in a 3G or universal mobile telecommunications service (UMTS) network) of one or more UEs. In some cases, a base station of a wireless communications system may cache certain content locally for reducing latency.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example, a method of wireless communication operable at a user equipment (UE) is disclosed. The method includes transmitting a UE capability message indicative of whether the UE supports a UE-assisted selective acceleration by local caching, and transmitting a data packet including assistance information (AI) to request the UE-assisted selective acceleration of the data packet by the local caching.

In another example, an apparatus for wireless communication is disclosed. The apparatus may include a memory device, a transceiver, and at least one processor communicatively coupled to the memory device and the transceiver, configured to transmit a UE capability message indicative of whether a UE supports a UE-assisted selective acceleration by local caching, and transmit a data packet including AI to request the UE-assisted selective acceleration of the data packet by the local caching.

In another example, a method of wireless communication operable at a base station is disclosed. The method includes receiving a capability message from a UE, wherein the capability message indicates support of a UE-assisted selective acceleration using a local cache, receiving a data packet from the UE, wherein the data packet includes AI requesting UE-assisted selective acceleration of the data packet, and routing the data packet to the local cache or to a core network, according to the AI.

In another example, an apparatus for wireless communication is disclosed. The apparatus may include a memory device, a transceiver, and at least one processor communicatively coupled to the memory device and the transceiver, configured to receive a capability message from a UE, wherein the capability message indicates support of a UE-assisted selective acceleration using a local cache, receive a data packet from the UE, wherein the data packet includes AI requesting UE-assisted selective acceleration of the data packet, and route the data packet to the local cache or to a core network, according to the AI.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
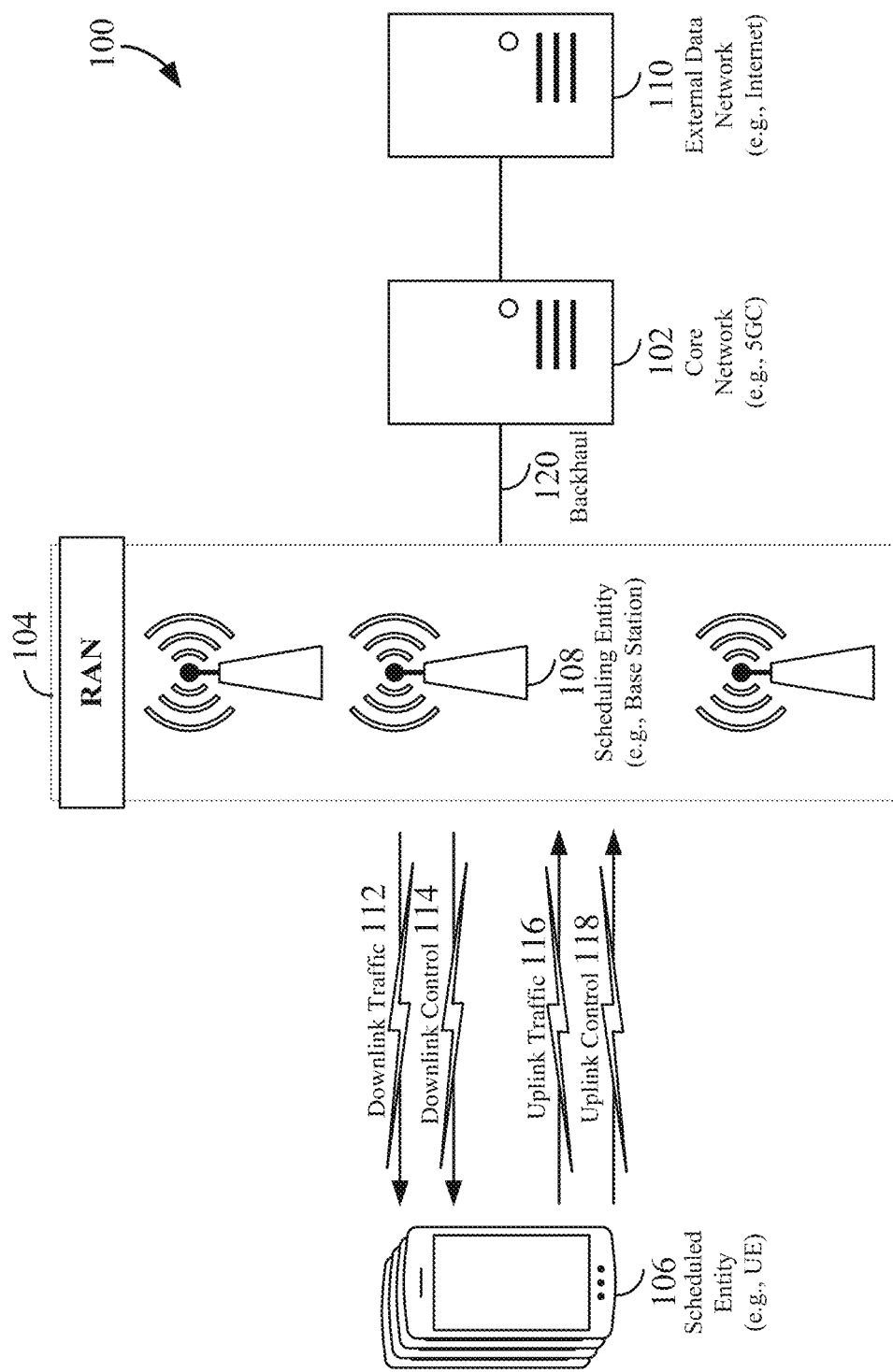
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Definitions

AI: assistance information (AI) communicated to a scheduling entity by a scheduled entity in support of scheduled entity assisted caching. The AI may be communicated via any combination of the control plane solutions for assisted packet routing disclosed herein. The AI may include an acceleration indicator, subscription information, service type, etc.

Service Type: the service type may refer to a types, classes, and categories of data (e.g., web browsing, video streaming, VoIP, mission critical applications, multi-hop networks, remote operations with real-time feedback, etc.), of user (i.e., video resolutions or video rate for a UE subscription, local cache server services associated with the UE subscription, etc.), or characteristics of either (e.g., quality of service (QoS) requirements, latency requirements, network slice or service profile, etc.).

SIB: system information blocks (SIBs) can carry relevant information throughout a mobile network, for example, from a broadcasting scheduling entity to a plurality of scheduled entities. SIBs can assist the scheduled entities to access a cell, perform cell re-selection.

DPI: deep packet inspection (DPI) is a form of computer network packet filtering that examines the data part of a packet. For example, the scheduling entity may perform DPI on a packet received from a scheduled entity to determine certain information.

PDCP: packet data convergence protocol (PDCP). The PDCP layer may be part of Layer 2 (L2), located on top of the radio link control (RLC) layer. The PDCP layer may provide multiplexing between different radio bearers and logical channels, among other functions.

PDU: as used herein, the protocol data unit (PDU) may be a unit of data which is specified in a protocol of a given layer and which consists of protocol-control information and possibly user data of that layer.

Network Communication

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, radio frequency (RF) chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
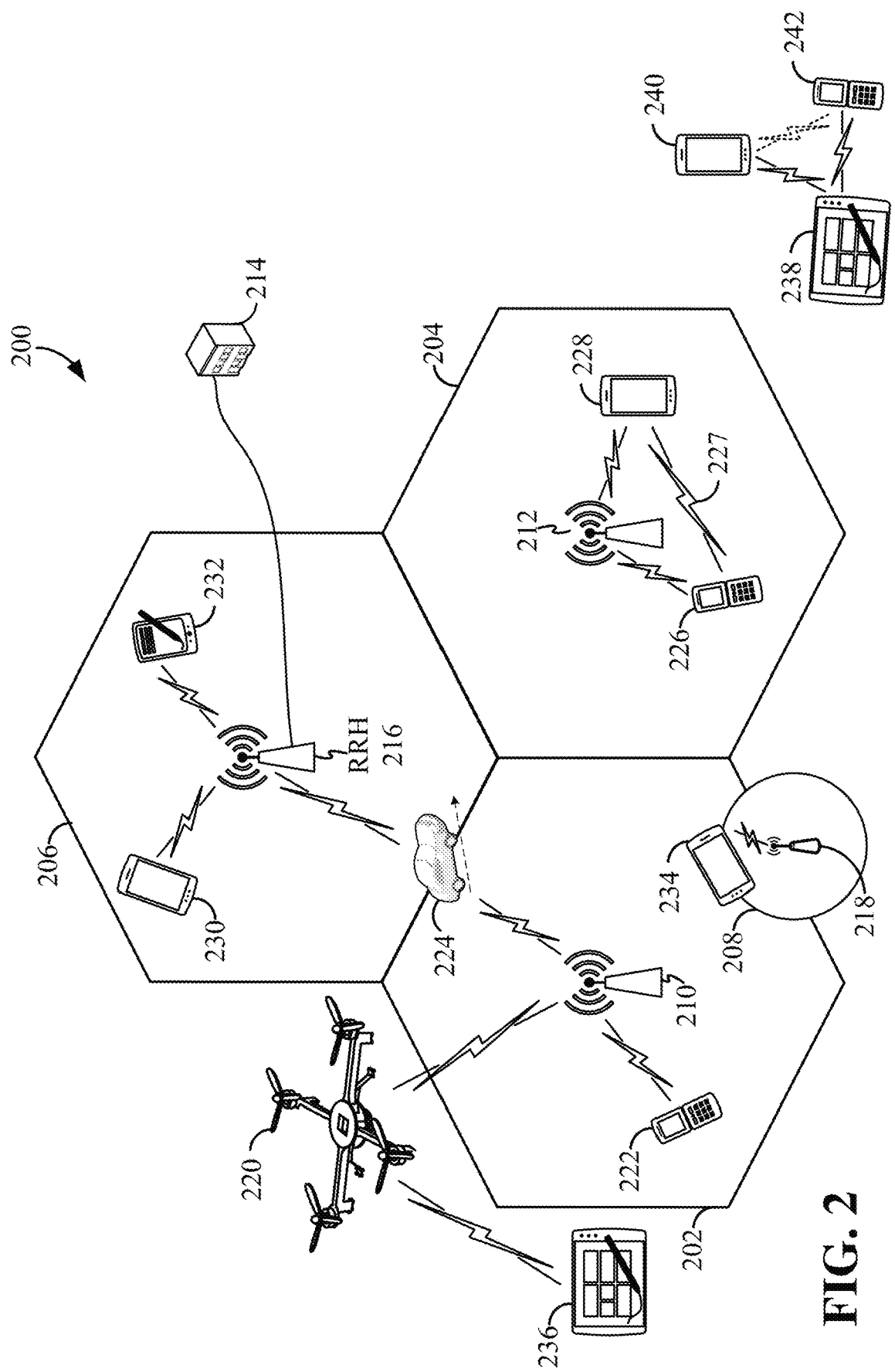
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
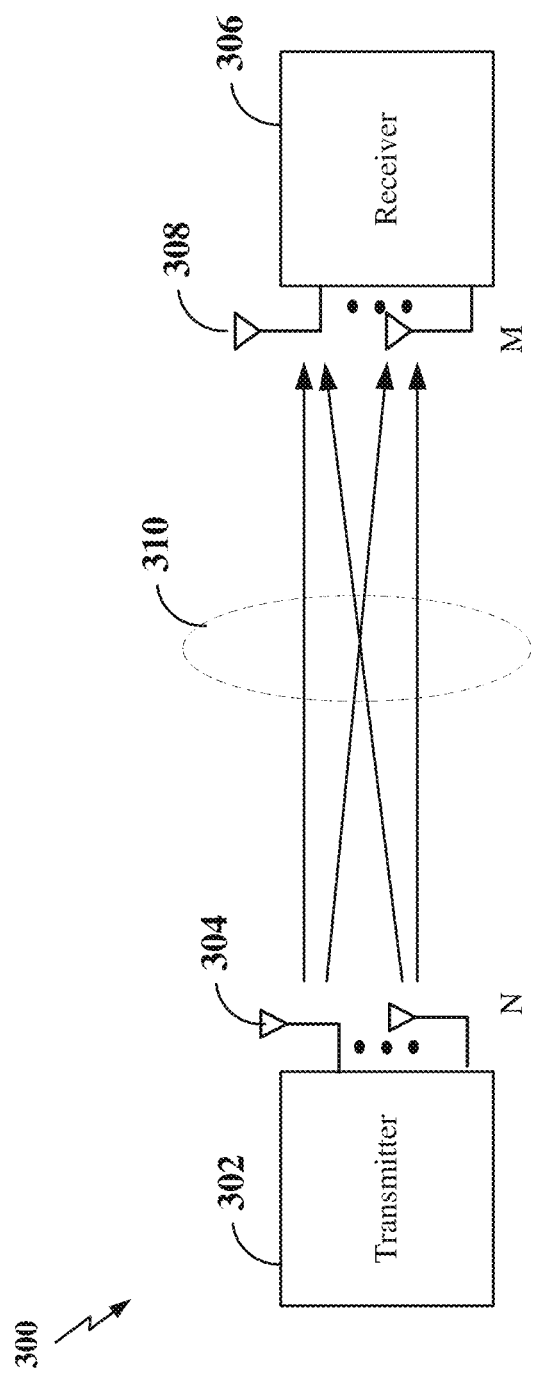
FIG. 3 is a block diagram illustrating a wireless communication system supporting multiple-input multiple-output (MIMO) communication.

In some aspects of the disclosure, the scheduling entity and/or scheduled entity may be configured for beamforming and/or multiple-input multiple-output (MIMO) technology. FIG. 3 illustrates an example of a wireless communication system supporting a MIMO system 300. In a MIMO system 300, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feedback a channel quality indicator (CQI) and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Local Caching

Figure 4:
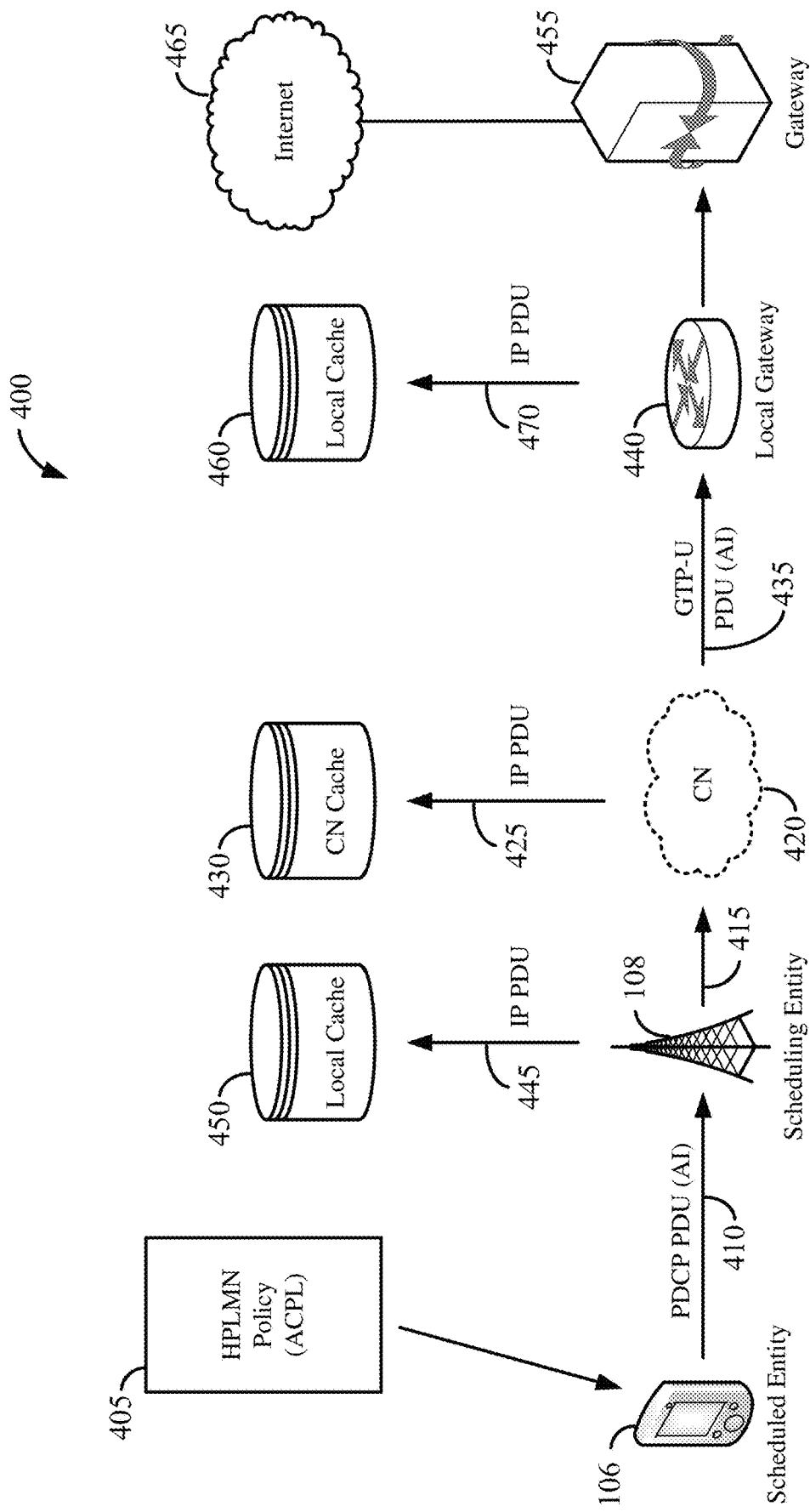
FIG. 4 is a conceptual diagram illustrating an example of a wireless communication system interconnected with a data network that support user entity (UE) assisted packet routing at the scheduling entity according to some embodiments.

FIG. 4 illustrates an example of a wireless communication system 400 interconnected with a data network that supports local caching in accordance with various aspects of the present disclosure. In some examples, wireless communication system 400 may implement some aspects of wireless communication system 100.

Local caching (e.g., mobile content delivery networks (CDN), multi-access edge computing (MEC), etc.) refers generally to network configurations where desired content (e.g., media of various types) is stored or cached at local nodes, or the nodes closest to the requesting users. This may be done to reduce the traffic load on the backhaul links of the given network, and to speed up access times for the requesting users. When the network involves a mobile network, a network may cache content close to an edge router (e.g., a packet gateway (PGW) in an LTE system, a user plane function (UPF) in a 5G or NR system, or a gateway GPRS support node (GGSN) in a 3G or universal mobile telecommunications service (UMTS) network) of one or more UEs. In some cases, the base station 108 may cache certain content locally for reducing latency.

In some existing networks that utilize local caching, the base station 108 may generally rely on deep packet inspection (DPI) to determine whether an UL packet received from a UE 106 should be routed to the local cache 450/460, or to the CN 420. That is, the base station 108 may inspect the UL packet (e.g., for a destination URL) to determine if responsive data may be present in the local cache 450/460. If it is determined that the local cache 450/460 may have data responsive to the UL packet, the base station 108 may route the uplink packet to the local cache 450/460 in an IP PDU 445/470.

However, DPI can be resource-intensive for the base station 108. Thus, some recent networks that implement local caching have been configured to utilize a UE-assisted selective acceleration by a local caching function. That is, the base station 108 may utilize certain UE assistance information (AI) so that it may avoid performing DPI to determine whether to access the local cache 450/460. In some cases, this UE AI may include an acceleration indicator or related AI that a base station 108 may receive and identify as an indicator that the packet should be routed to one of the local cache 450/460 or to the CN 420. For example, upon identifying that the AI is present in an uplink packet, the base station 108 may transmit the packet to a gateway having a local cache 450/460 in order to accelerate access time for the UE and to reduce traffic on the mobile network. If the uplink packet does not have AI, the base station 108 may perform DPI and route the uplink packet according to an address (e.g., a uniform resource locator (URL)) contained in the packet. The base station 108 may also perform DPI if the UE is not authorized to utilize the requested UE-assisted selective acceleration or AI. In another example, the base station 108 may also perform DPI if the base station 108 does not support the requested UE-assisted selective acceleration or AI, or if the base station 108 does not support recognition of UE-assisted selective acceleration or AI. Throughout this disclosure, the UE-assisted selective acceleration by a local caching function may also be referred to as an assisted local caching feature.

In some cases, content associated with a particular data service (e.g., a data service that provides video content to a UE 106) may be associated with AI, and a base station 108 may configure the UE 106 to set AI for uplink packets of the service. In some cases, a base station 108 may be aware that a particular service has data cached as a local gateway. The base station 108 may identify that an uplink packet from the UE 106 is associated with the service, and may route the uplink packet to the local cache 450/460 at the base station 108 or the local gateway 440 responsive to identifying the uplink packet as being associated with the service. In some cases, the base station 108 may route the uplink packet based on value(s) of AI irrespective of an Internet Protocol (IP) address or a traffic flow template (TFT) of the uplink packet. In some cases, the base station 108 may also perform deep packet inspection (DPI) of the uplink packet, and may provide data that is cached internally to the CN 420 if the DPI indicates that such data is cached internally to the CN 420. In some cases, the gateway corresponds to a traffic offload function (TOF) of the CN 420. In some cases, the gateway corresponds to a local user plane function (UPF) and a different gateway corresponds to a macro UPF.

In the example of FIG. 4, the UE 106 may have an established connection with a base station 108. In some cases, the UE 106 may be configured with a home public land mobile network (HPLMN) policy 405 which may include an authorized content provider list (ACPL) that may include URL information. In some examples, the ACPL may include at least one content provider entry, and each of the content provider entries may be associated with at least one of: a uniform resource locator (URL), a uniform resource identifier (URI), a domain name, a hypertext transfer protocol (HTTP) server internet protocol (IP) address, a port identifier, a protocol type, or a combination thereof. In some cases, the HPLMN policy 405 and/or the ACPL may indicate that certain uplink packets from the UE 106 are to include an AI. The ACPL may be pre-configured to the UE by the HPLMN via an OMA-DM, by radio resource control (RRC) or non-access stratum (NAS) signaling (e.g., a RRC/NAS message), or broadcast information. In some examples, the UE 106 may receive the RRC/NAS signaling from the base station 108 to configure certain services to include an AI, while one or more other services may not include an AI. The UE 106 may transmit a PDCP PDU 410 that includes an indication that AI is set for the packet. The base station 108, alone or in conjunction with the CN 420 (e.g., a serving gateway (SGW) or packet data network (PDN) gateway (PGW) within the CN 420) may receive the PDCP PDU 410 and identify whether AI is set or not, and route the packet through the CN 420 to a local gateway 440 based on whether AI is provided.

The local gateway 440 may have a local data content (DC) or local cache 450/460 that may include data that is responsive to data to be provided in response to the uplink packet from the UE 106. The local gateway 440 may thus be external to the CN 420, and the uplink packet may be routed to the local cache 450/460 through a GPRS tunneling protocol user plane (GTP-U) packet 435. The local gateway 440 may identify the GTP-U packet 435 and route an IP PDU 470 to the local cache 460 to obtain data responsive to the uplink packet. If AI in the uplink packet is not set, the base station 108, alone or in conjunction with CN 420, may route the uplink packet using a URL through the local gateway 440 to an Internet gateway 455. The Internet gateway 455 may route the packet according to an Internet protocol to the Internet 465.

In some cases, the CN 420 may optionally also have its own local DC/cache, referred to as CN cache 430. In such cases, if the uplink packet does not have AI, the base station 108, alone or in conjunction with the CN 420, may perform a deep packet inspection (DPI) in which the uplink packet may be inspected (e.g., for a destination URL) to determine if responsive data may be present in the CN cache 430. If it is determined that the CN cache 430 may have data responsive to the uplink packet, the base station 108 and/or CN 420 may route the uplink packet to the CN cache 430 in an IP PDU 425. In cases where the optional CN cache 430 is present, the wireless communication system 400 may include caching both internal to the CN 420 and external to the CN 420, which may be referred to as below the local gateway 440 or above the local gateway 440, respectively.

As indicated above, in some cases the UE 106 may provide information in uplink packets that may be used to determine if responsive data is present in local DC/cache 450 or in CN cache 430. Such information provided by the UE 106, which may be included in AI, may provide assisted local caching for the UE 106, which may reduce an amount of DPI that the base station 108 may have to perform, which in turn may enhance the efficiency of the base station 108.

In some examples, described further below, the AI may be included in a PDCP header of an uplink packet. It is also possible to include the AI in other layer 2 protocols, such as in an RLC header, or a MAC control element (MAC CE). In some cases, as indicated above, the AI may be supported in other forms, such as a service type indicating the uplink packet is for the type of service eligible for local caching.

Local caching as discussed in various examples here may be useful in reducing the backhaul cost of a network operator, and may also improve the QoE of video streaming Such assisted local caching by a UE 106 may provide a relatively efficient solution to achieve caching to the edge for both 5G and 4G networks, and in some cases, may be extended to caching for other protocols, such as file transfer protocol (FTP) by FTP proxy in the UE 106 and base station 108.

Figure 5:
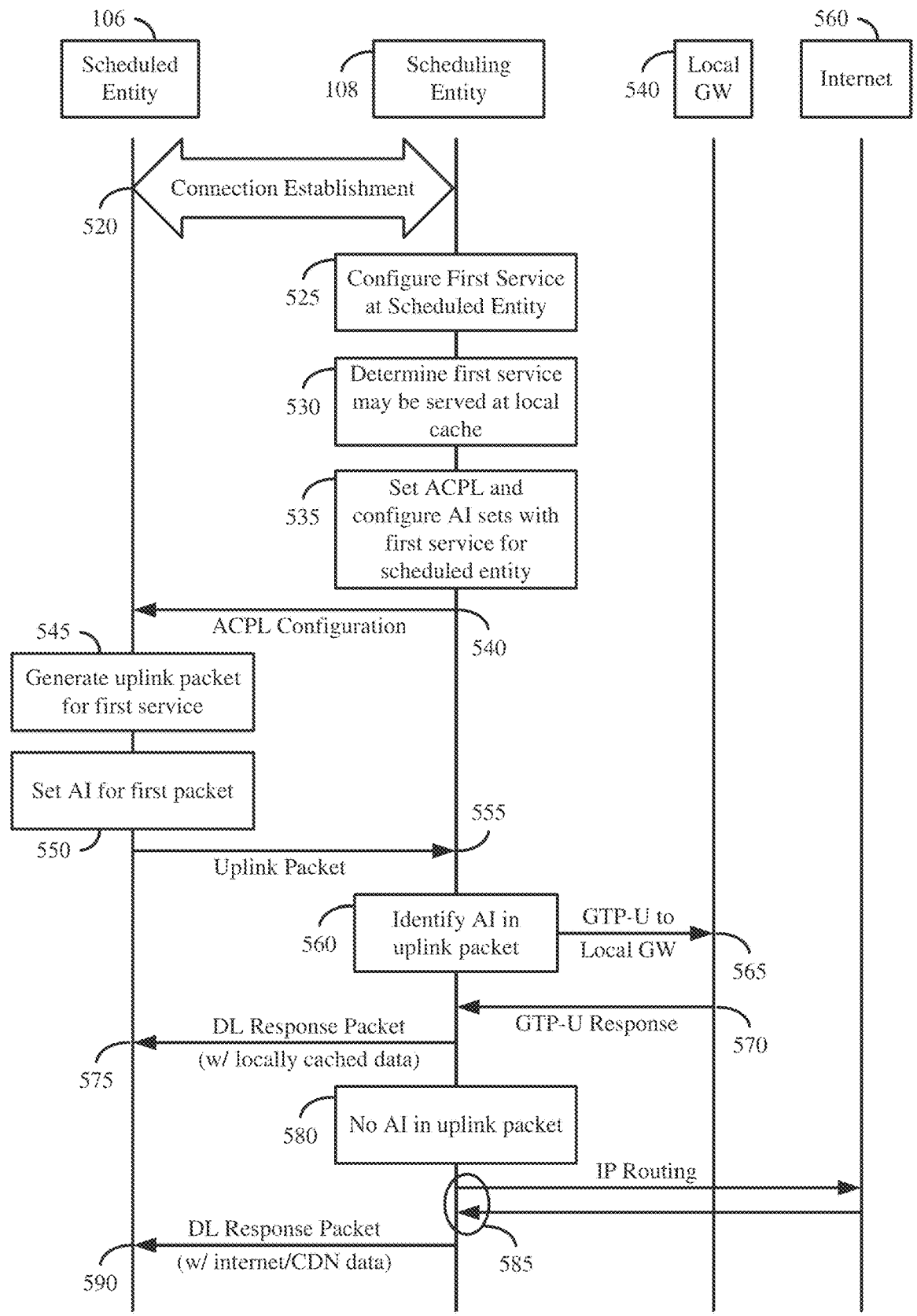
FIG. 5 is a conceptual process flow that supports UE-assisted packet routing according to some embodiments.

FIG. 5 illustrates an example of a process flow 500 that supports user-plane assisted local caching packet routing at a base station 108 in accordance with various aspects of the present disclosure. In some examples, wireless communication systems may implement aspects of the wireless communication system 100 and the wireless communication system 400 of FIG. 4. In the example of FIG. 5, a UE 106, a base station or scheduling entity 108, a local GW 440, and an Internet 465 or content delivery network (CDN) may perform various functions for data content delivery.

The UE 106 and base station 108 may establish a connection 520, according to established wireless connection establishment techniques. At block 525, the base station 108 may configure a first service at the UE 106. In some cases, the first service may be a video content delivery service, for example.

At block 530, the base station 108 may determine that the first service may be served by a local cache 450/460. In some cases, the local cache 450/460 may be associated with the local GW 440 that may be external to the base station 108. The local cache 450/460 may be located, for example, relatively close to the base station 108 and thus may have reduced backhaul costs compared to serving data associated with the first service through the internet 465.

At block 535, the base station 108 may set an authorized content provider list (ACPL) and configure associated AI that include the first service for the UE 106. The base station 108 may transmit an ACPL configuration 540 to the UE 106, such as through RRC signaling, for example.

At block 545, the UE 106 may generate an uplink packet for the first service. At block 550, the UE 106 may set the AI for the uplink packet based on the first service, and the configuration of the first service by the base station 108. The UE 106 may then transmit the uplink packet 555 to the base station 108.

The base station 108 may receive the uplink packet and identify a value of the AI. If the AI value(s) indicates local caching for the service of the uplink packet, the base station 108 may transmit a GTP-U packet 565 to the local GW 440. The local GW 440 may provide GTP-U response 570 that may include data responsive to the uplink packet to the base station 108, which may in turn transmit a downlink response packet 575 with the locally cached data to the UE 106.

At block 580, the base station 108 may determine that AI is not present in the uplink packet. The base station 108 may then initiate IP routing 585 with the internet 465, based on routing information and a URL in the uplink packet. The base station 108 may then transmit a downlink response packet 590 to the UE 106 with the internet/CDN data.

User Plane Solutions for Assisted Local Cache Packet Routing

In some aspects of the disclosure, the UE 106 may provide the AI over the user plane or data plane. In other words, the AI may be provided to the base station 108 along with user data packets. There are several different ways in which the AI can be provided over the user plane. For example, FIGS. 6-11 illustrate exemplary header configurations 600-1100 according to aspects of the present disclosure. Specifically, FIGS. 6-11 illustrate an uplink packet data convergence protocol (PDCP) protocol data unit (PDU) in which certain bits may be used for AI. As illustrated, the PDCP PDU may be an octet aligned bit string. The PDCP PDU may include a D/C field (D referring to user-plane data and C referring to control information from a PDCP layer) that may carry user plane information, a plurality of reserved bits or fields having one or more bits (labeled "R"), a PDCP sequence number (SN), all in a first octet (Oct 1). A second octet (Oct 2) may include a continuation of the PDCP SN.

The reserved fields, which may each be a bit in length, may be utilized according to aspects of the present disclosure to carry AI of the UE 106. Accordingly, the base station 108 may be configured to detect these bits and associate them with AI, instead of just ignoring these bits. For example, a single reserved field may be used, such as setting the first reserved field to 1 in order to indicate that the UE 106 is requesting acceleration (e.g., via use of the local cache 450/460). In another example, two or more of the reserved fields may be used, such as setting each to either a 1 or 0 to indicate additional information about the UE's request for acceleration. In this example, one of the reserved bits may indicate that the UE is requesting acceleration for a particular PDU. The remaining reserved bits may indicate a service type selection. The service type selection may include specific cache information, such as, for example, video resolution and video rate. The service type selection may also include information regarding UE's subscription and/or characteristics of one or more network slices (e.g., broadband data rate, bandwidth, etc.). In this example, the base station 108 may detect the information provided in the reserved fields and/or the new field (i.e., one byte) by referring to a look-up table stored in a memory device that includes bit combinations and corresponding meanings.

In a further example, the AI may provide for additional granularity of acceleration indications to provide for multiple service types. In this example, an acceleration indication may be associated with each service type included in the AI. For example, several bits of information may act as the AI to provide the base station 108 with an acceleration indication for a selection from multiple levels of video resolutions and/or data rates according to the UE subscription. In one example, different service types may be identified by the base station 108 using a bit indication (e.g., one of the reserved bits). In another example, different service types are identified by the base station 108 by the location of the reserved bit or bits, wherein flagging the bit indicates an acceleration indication for that service type.

Figure 6:
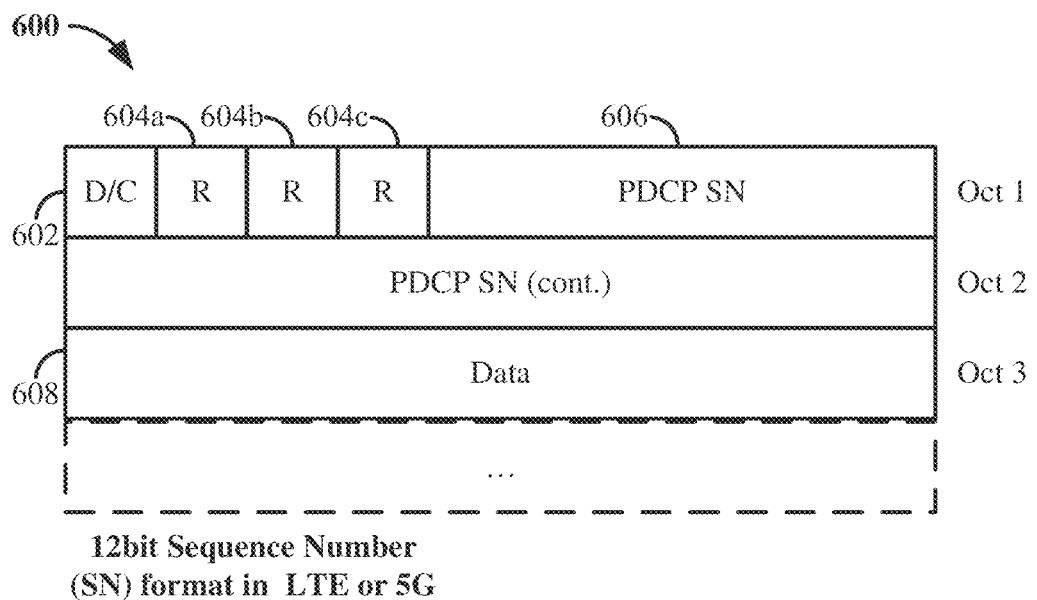
FIG. 6 is a conceptual example of a packet data convergence protocol (PDCP) protocol data unit (PDU) having a 12-bit sequence number (SN) and three reserved bits according to some embodiments.

In the example of FIG. 6, the UE 106 may provide AI or a request for acceleration to the base station 108 in any one or more of the three reserved fields 604a-604c of a PDCP PDU 600 containing several other fields. For example, one or more of the reserved fields 604a-604c may include a request for acceleration of data 608 in the PDCP PDU 600, and/or additional AI. As illustrated, the PDCP PDU 600 may include a D/C field 602, three reserved fields 604a-604c positioned after the D/C field 602, and a PDCP SN 606 positioned after the reserved fields 604a-604c, all in a first octet (Oct 1). A second octet (Oct 2) may include a continuation of the PDCP SN 606, and a third octet (Oct 3) may include data 608, which may continue for additional octets. Thus, as shown, the PDCP PDU 600 contains three octets, but can optionally contain N octets. In this example, the PDCP PDU 600 includes a 12-bit SN format in LTE or 5G.

Figure 7:
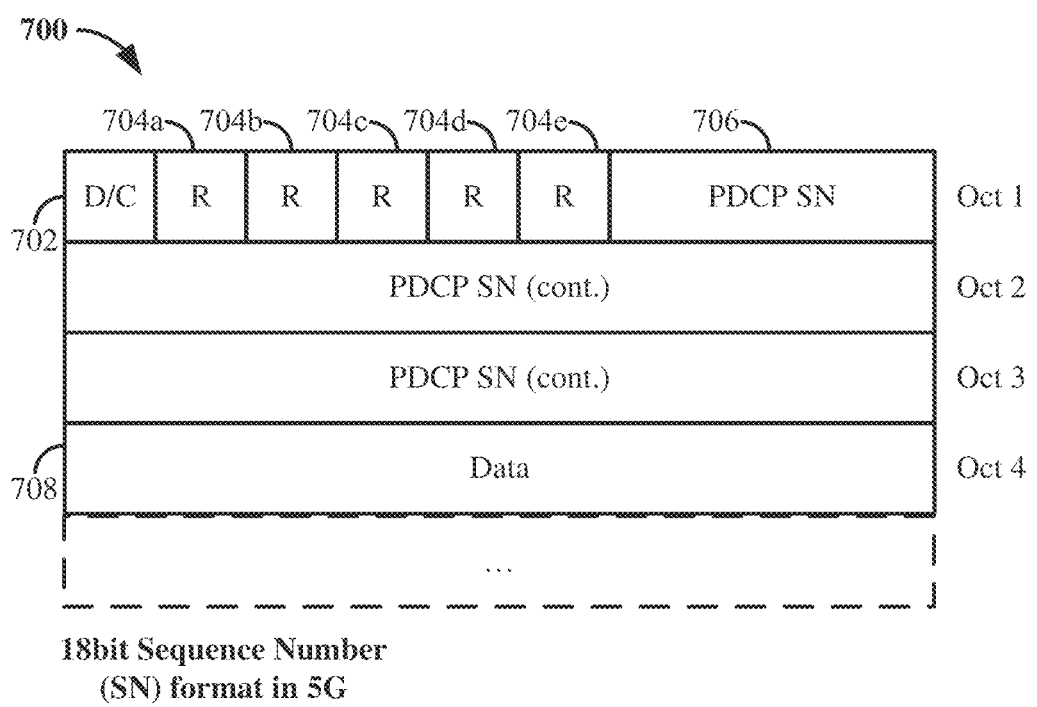
FIG. 7 is a conceptual example of a PDCP PDU having an 18-bit SN and five reserved bits.

In the example of FIG. 7, the UE 106 may provide AI or a request for acceleration to the base station 108 in any one or more of five reserved fields 704a-704e of the PDCP PDU 700 positioned after a D/C field 702. For example, one or more of the reserved fields 704a-704e may include a request for acceleration of the data in the PDCP PDU 700, and/or additional AI. As illustrated, the PDCP PDU 700 may include the D/C field 702, five reserved fields 704a-704e, and a PDCP SN 706, all in a first octet (Oct 1). A second octet (Oct 2) and a third octet (Oct 3) may include a continuation of the PDCP SN 706, and a fourth octet (Oct 4) may include data 708, which may continue for additional octets. Thus, as shown, the PDCP PDU 700 contains four octets, but can optionally contain N octets. In this example, the PDCP PDU 700 includes an 18-bit SN format in 5G. In another example, the PDCP PDU 700 may contain additional or fewer reserved fields.

Figure 8:
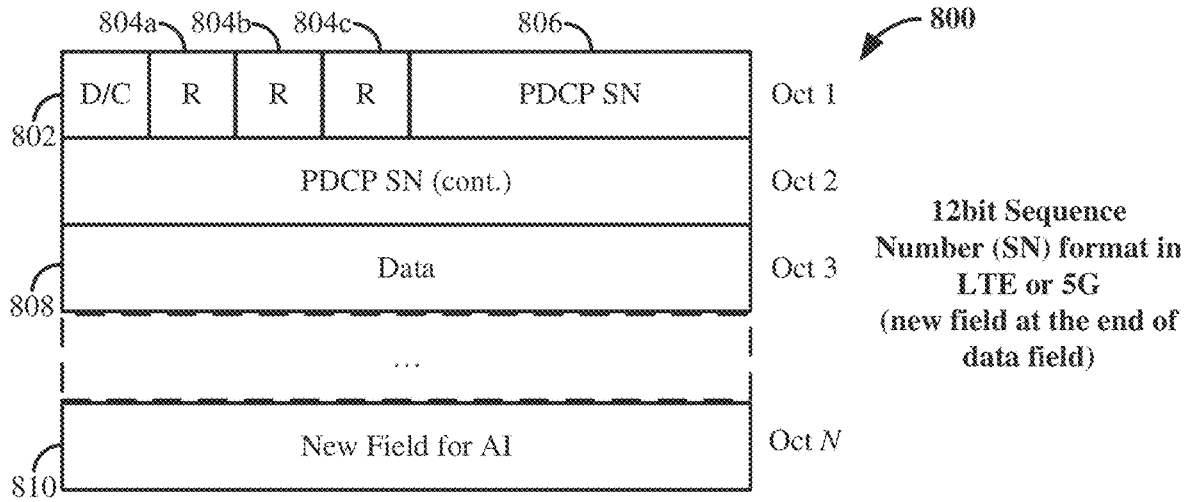
FIG. 8 is a conceptual example of a PDCP PDU having a 12-bit SN and a new field at the end of a data field.

In the example of FIG. 8, the UE 106 may provide AI or a request for acceleration to the base station 108 in any one or more of the three reserved fields 804a-804c of the PDCP PDU 800. For example, one or more of the reserved fields may include a request for acceleration of the data in the PDCP PDU 800, and/or additional AI. As illustrated, the PDCP PDU 800 may contain several fields, including a D/C field 802, three reserved fields 804a-804c, and a PDCP SN 806, all in a first octet (Oct 1). A second octet (Oct 2) positioned after the first octet may include a continuation of the PDCP SN 806, and a third octet (Oct 3) positioned after the first and second octets may include data 808, which may continue for additional octets. Octet N (Oct N) may include a new field 810 positioned at the end of the PDCP data 808 having additional AI or an acceleration information. In this example, one or more of the reserve fields 804a-804c may be used to indicate that the PDCP PDU 800 includes the new field 810. Thus, as shown, the PDCP PDU 800 contains four octets, but can optionally contain N octets. In this example, the PDCP PDU 800 includes a 12-bit SN format in LTE or 5G. In another example, the PDCP PDU 800 may contain additional or fewer reserved fields.

Figure 9:
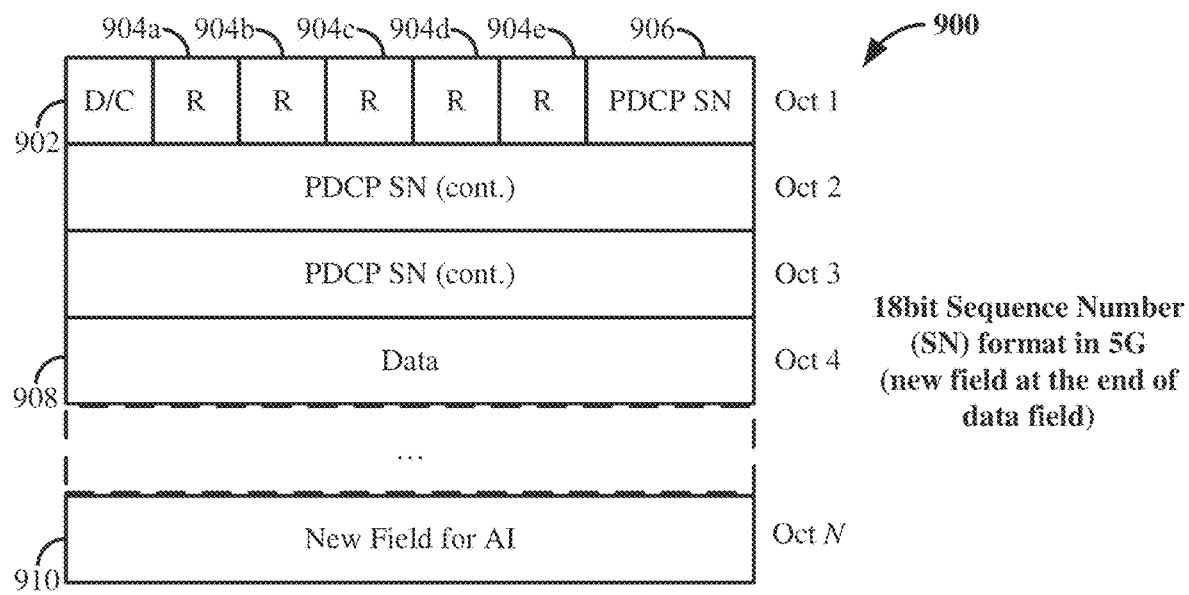
FIG. 9 is a conceptual example of a PDCP PDU having an 18-bit SN and a new field at the end of the data field.

In the example of FIG. 9, the UE 106 may provide AI or a request for acceleration to the base station 108 in any one or more of the five reserved fields 904a-904e of the PDCP PDU 900. For example, one or more of the reserve fields may include a request for acceleration of the data in the PDCP PDU 900, and/or additional AI. As illustrated, the PDCP PDU 900 may include a D/C field 902, three reserved fields 904a-904c, and a PDCP SN 906, all in a first octet (Oct 1). A second octet (Oct 2) and a third octet (Oct 3) may include a continuation of the PDCP SN 906. A fourth octet (Oct 4) may include data 908, which may continue for additional octets. Octet N (Oct N) may include a new field 910 having additional AI or an acceleration information. In this example, one or more of the reserve fields 904a-904e may be used to indicate that the PDCP PDU 900 includes the new field 910. Thus, as shown, the PDCP PDU 900 contains five octets, but can optionally contain N octets. In this example, the PDCP PDU 900 includes an 18-bit SN format in 5G. In another example, the PDCP PDU 900 may contain additional or fewer reserved fields.

Figure 10:
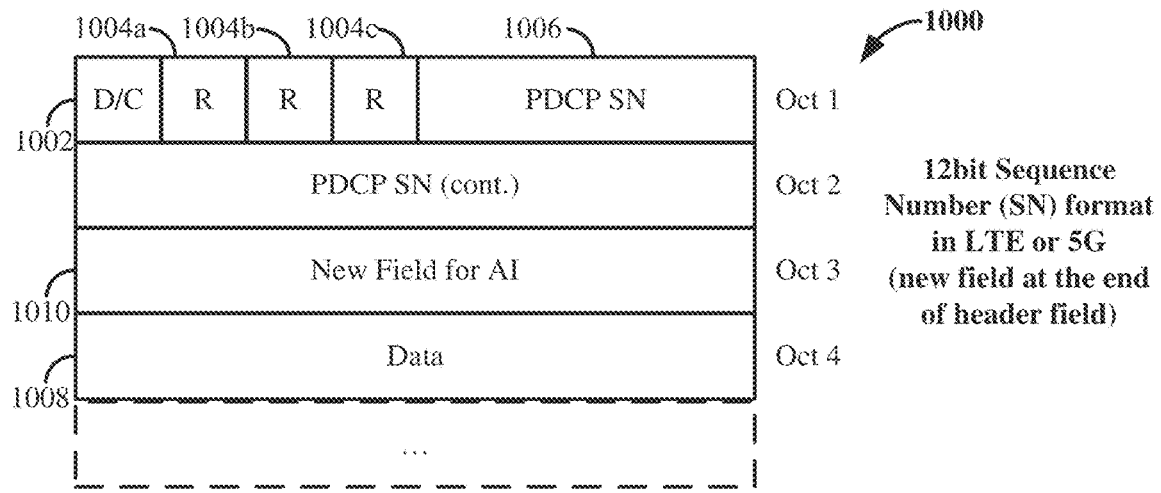
FIG. 10 is a conceptual example of a PDCP PDU having a 12-bit SN and a new field at the end of a header field.

In the example of FIG. 10, the UE 106 may provide AI or a request for acceleration to the base station 108 in any one or more of the three reserved fields (1004a-1004c) of the PDCP PDU 1000. For example, one or more of the reserve fields may include a request for acceleration of the data in the PDCP PDU 1000, and/or additional AI. As illustrated, the PDCP PDU 1000 may include a D/C field 1002, three reserved fields 1004a-1004c, and a PDCP SN 1006, all in a first octet (Oct 1). A second octet (Oct 2) may include a continuation of the PDCP SN 1006. A third octet (Oct 3) may include a new field 1010 having additional AI or an acceleration information. A fourth octet (Oct 4) may include data 908, which may continue for additional octets. In this example, one or more of the reserve fields 1004a-1004c may be used to indicate that the PDCP PDU 1000 includes the new field 1010. Thus, as shown, the PDCP PDU 1000 contains four octets, but can optionally contain N octets. In this example, the PDCP PDU 1000 includes an 12-bit SN format in LTE or 5G. In another example, the PDCP PDU 1000 may contain additional or fewer reserved fields.

Figure 11:
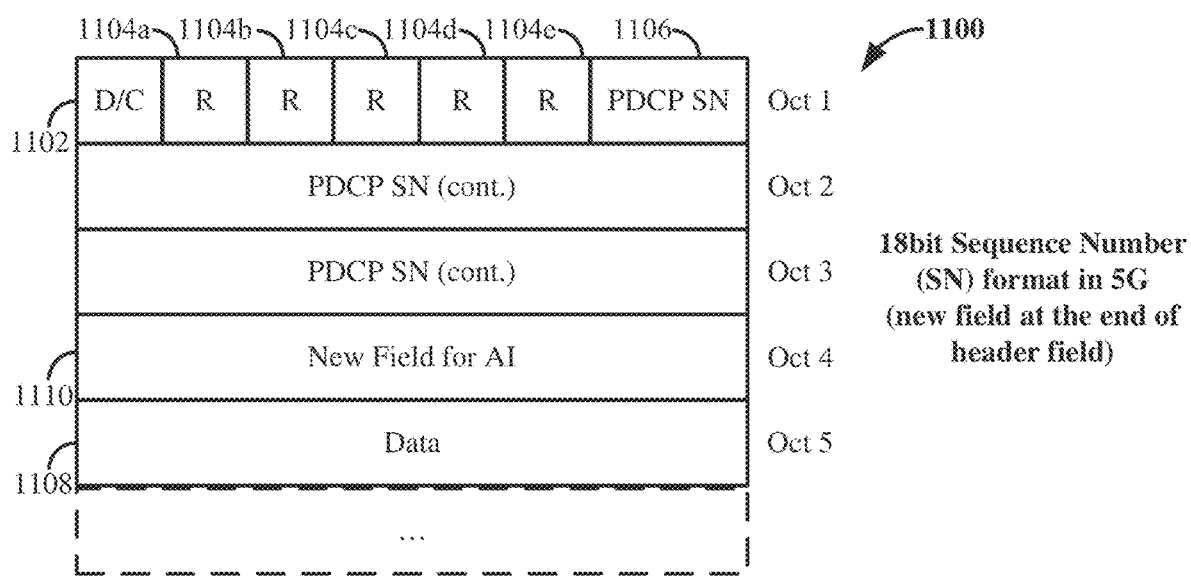
FIG. 11 is a conceptual example of a PDCP PDU having an 18-bit SN and a new field at the end of the header field.

In the example of FIG. 11, the UE 106 may provide AI or a request for acceleration to the base station 108 in any one or more of the five reserved fields (1104a-1104e) of the PDCP PDU 1100. For example, one or more of the reserve fields (1104a-1104e) may include a request for acceleration of the data in the PDCP PDU 1100, and/or additional AI. As illustrated, the PDCP PDU 1100 may include a D/C field 1102, three reserved fields 1104a-1104e, and a PDCP SN 1106, all in a first octet (Oct 1). A second octet (Oct 2) and a third octet (Oct 3) may include a continuation of the PDCP SN 1106. A fourth octet (Oct 4) may include a new field 1110 having additional AI or an acceleration information. A fifth octet (Oct 5) may include data 1108, which may continue for additional octets. In this example, one or more of the reserve fields 1104a-1104c may be used to indicate that the PDCP PDU 1100 includes the new field 1110. Thus, as shown, the PDCP PDU 1100 contains five octets, but can optionally contain N octets. In this example, the PDCP PDU 1100 includes an 18-bit SN format in 5G. In another example, the PDCP PDU 1100 may contain additional or fewer reserved fields.

Figure 12:
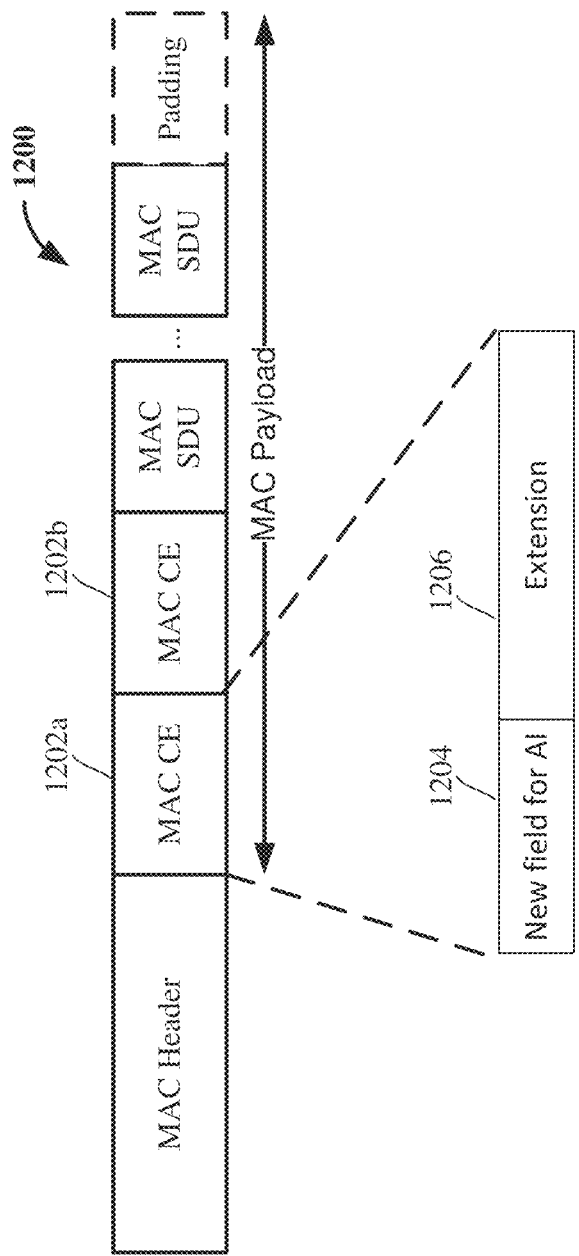
FIG. 12 is a conceptual example of a unique media access control (MAC) control element (CE) having a new field for assistance information (AI) according to some embodiments.

In another example of user plane configuration, FIG. 12 illustrates a MAC PDU 1200 containing two MAC control elements (CEs) (1202a and 1202b) in the MAC payload. One or more of the MAC CEs (1202a and 1202b), which may be an octet in length, may utilized according to aspects to the present disclosure to carry acceleration and/or AI. In one example, the first MAC CE 1202a may be a unique CE configuration relative to a standard configuration of the second MAC CE 1202b, having up to three new bits that can be identified as acceleration and/or AI associated with the MAC PDU 1200. The up to three new bits may be indicative of a new local code ID (LCID) field. The remaining bits may be reserved for future extension 1206 of the first MAC CE 1202a.

Control Plane Solutions for Assisted Local Cache Packet Routing

Figure 13:
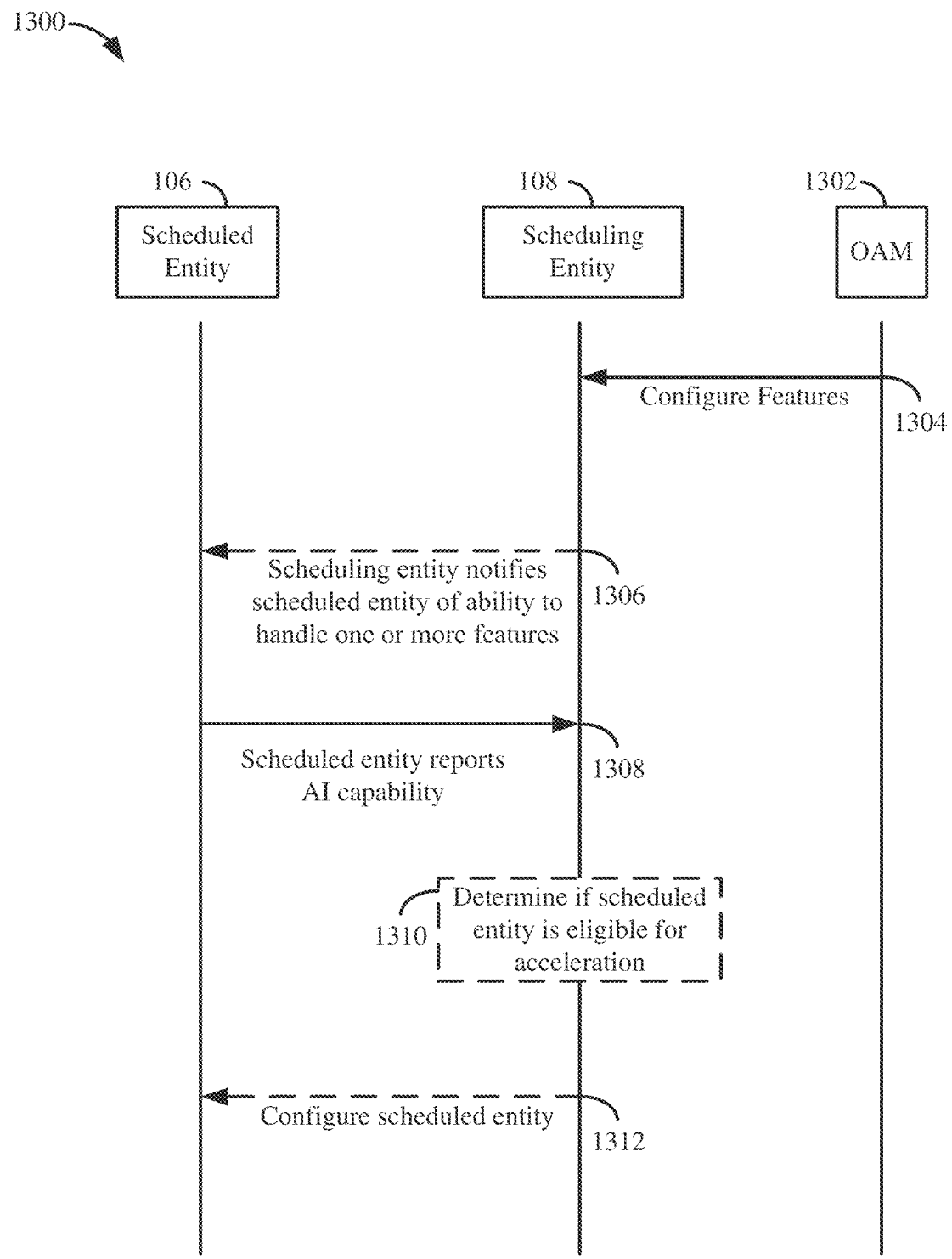
FIG. 13 is a conceptual process flow that supports, in part, configuring a UE and a base station for a local caching capability according to some embodiments.

Using the user plane solutions discussed above, the UE 106 supporting UE-assisted selective acceleration by a local caching function, may notify the base station 108 in a packet such that the base station 108 may route the packet to a local cache 450/460. However, coordination between the UE 106 and base station 108 may be desired. Such coordination reduces traffic on the mobile network and provides for enabling and disabling the local caching feature. Further, in a diverse network where not all UEs may support the local caching feature, and where a base station may not provide consistent support for the local caching feature, a UE 106 may notify the base station 108 that the UE 106 supports the UE-assisted local caching feature. Similarly, a base station 108 may notify the UE 106 that the base station 108 supports the UE-assisted local caching feature. Accordingly, certain control plane signaling between the UE 106 and a base station 108 may allow for coordination of the local caching feature and communication of abilities. FIG. 13 illustrates an example process flow 1300 of control-plane signaling to support UE-assisted packet routing between a UE 106 and a base station 108 in accordance with various aspects of the present disclosure. A number of the elements shown in this example are optional, and are illustrated using a dashed line. Throughout this disclosure, the UE-assisted selective acceleration by a local caching function may also be referred to as an assisted local caching feature.

In one example, at a first element 1304, the base station 108 may be configured by operation and maintenance (OAM) of the base station 108, or another entity, to support assisted local caching feature. For example, the first element 1304 may include a features configuration message providing the base station 108 with a lookup table having entries corresponding to AI that may be provided by the UE 106 such that the base station 108 can receive, interpret, and respond to the AI. The features configuration message may be communicated to the base station 108 in response to receiving a data packet containing an AI. The look-up table may be stored in a memory device of the base station 108.

In another example, at a second element 1306, a base station 108 that is configured to handle receiving AI from the UE 106 may optionally notify one or more scheduled entities 106 of its ability to handle one or more features associated with assisted packet routing. The base station 108 may notify the scheduled entities 106 by broadcasting a system information block (SIB) throughout the wireless communication system 100.

In another example, at a third element 1308, the UE 106 may communicate a UE capability message to the base station 108 indicating support for assisted local caching. In one example, the UE 106 may communicate the AI to the base station 108 using UL packets via the user plane solutions discussed above without any regard for whether the base station 108 supports assisted local caching. That is, after the UE 106 communicates its capability to support assisted local caching, the UE 106 may then attempt to take advantage of this feature without any indication from the network whether the base station 108 actually will support the feature. In this case, if the base station 108 supports assisted local caching, then the base station 108 uses the AI to determine whether to route the UL PDU to the local cache, or to the CN. If the base station 108 does not support assisted packet routing, then the AI may be ignored, and the base station 108 may simply route the packet to the CN. In another example, the base station 108 may receive the message communicating the UE's 106 one or more features associated with assisted packet routing and determine that it cannot support the one or more features. In this example, the base station 108 may determine another base station (e.g., a second base station in the RAN) that can support the one or more features and initiate a communication between the UE 106 and the second base station.

In another example, at a fourth element 1310, the base station 108 may optionally determine if the UE 106 is eligible for the acceleration requested by the UE 106. In one example, after receiving the UE 106 capability information indicating UE 106 support of the assisted local caching feature, the base station 108 may determine if the UE 106 is eligible for the requested UE-assisted selective acceleration. Here, a UE's eligibility for the assisted local caching feature may be based, for example, on a subscription and/or service type associated with the UE 106. The subscription may include a type of plan provided by a service provider. For example, the base station 108 may check the ACPL associated with the UE to determine eligibility. If the UE is eligible for the feature, then the base station 108 may process any AI that the UE may provide in a packet utilizing the user-plane solutions described above. However, if the UE is not eligible for the feature, if the UE does not support the feature, or if the base station 108 does not support the feature, then the base station 108 may ignore any AI, and may simply route the packet to the CN.

In another example, at fifth element 1312, the base station 108 may optionally configure the UE 106 to use the assisted local caching feature. For example, the UE 106 may communicate its capability to support the assisted local caching feature to the base station 108 at the third element 1308. Upon receiving the UE capability information, the base station 108 may optionally determine if the UE 106 is eligible for acceleration. In the case that either the UE 106 passes the eligibility check or the base station 108 does not perform an eligibility check, the base station 108 may configure the UE 106 to use the packet acceleration feature by communicating an updated RRCConnectionReconfiguration message. Of course, this is merely one example, and any suitable control signal may be utilized for a base station 108 to configure a UE 106 to use the assisted local caching feature. If the base station 108 does not support assisted packet routing, or if the UE 106 is not eligible, then the UE capability information communicated at the third element 1308 may be ignored by the base station 108.

Abuse Handling

In some cases, a UE 106 may abuse the usage of the acceleration feature, for example by providing AI that it does not qualify for. For example, the UE 106 may too often indicate that a packet is eligible for acceleration via routing of data to the local cache 450/460. In another situation, a UE may provide AI that is inconsistent with the subscription or type of service associated with the UE 106. In order to prevent or eliminate such abuse, the base station 108 may detect that the UE 106 is ineligible for the service requested by executing the eligibility check at the fourth element 1310 of FIG. 13. The eligibility check on an UL packet may be performed by the base station 108 and may determine, via the ACPL, and/or any other data associated with the UE 106 or the particular UL packet, that the packet is not eligible for acceleration. In another example, the base station 108 may determine that the UL packet is eligible for a type or degree of acceleration that is inconsistent with the type or degree of acceleration indicated by the packet (e.g., UL packet indicates routing to ineligible local cache 460, but is eligible to route to local cache 450). In this example, the base station 108 may re-route the UL packet consistent with the type or degree of acceleration for which the UL packet is eligible regardless of the acceleration indicated by the packet. In this example, the base station 108 may determine that an inconsistency exists, and may communicate a configuration message to the UE 106 similar or identical to the message described in the fifth element 1312 in FIG. 13. In this example, the configuration message configures the UE 106 to include an AI in a data packet for requesting the UE-assisted selective acceleration of the data packet. In another example, if the UL packet contains an ineligible acceleration indication, the base station 108 may discard the packet, or disregard the acceleration indication and route the packet according to an address (e.g., a uniform resource locator (URL)) contained in the packet or set as a default at the base station 108.

In another example, the base station 108 may not execute an eligibility check to determine whether the UE 106 is eligible for the requested service. Instead, the base station 108 may route the UL PDU associated with the AI to the local cache 450/460. The local cache 450/460 may determine the eligibility of the UL PDU by checking the ACPL associated with the UE 106. If the UL PDU is not consistent with the UE's eligibility, then the UL PDU may be discarded by the local cache 450/460.

Scheduling Entity

Figure 14:
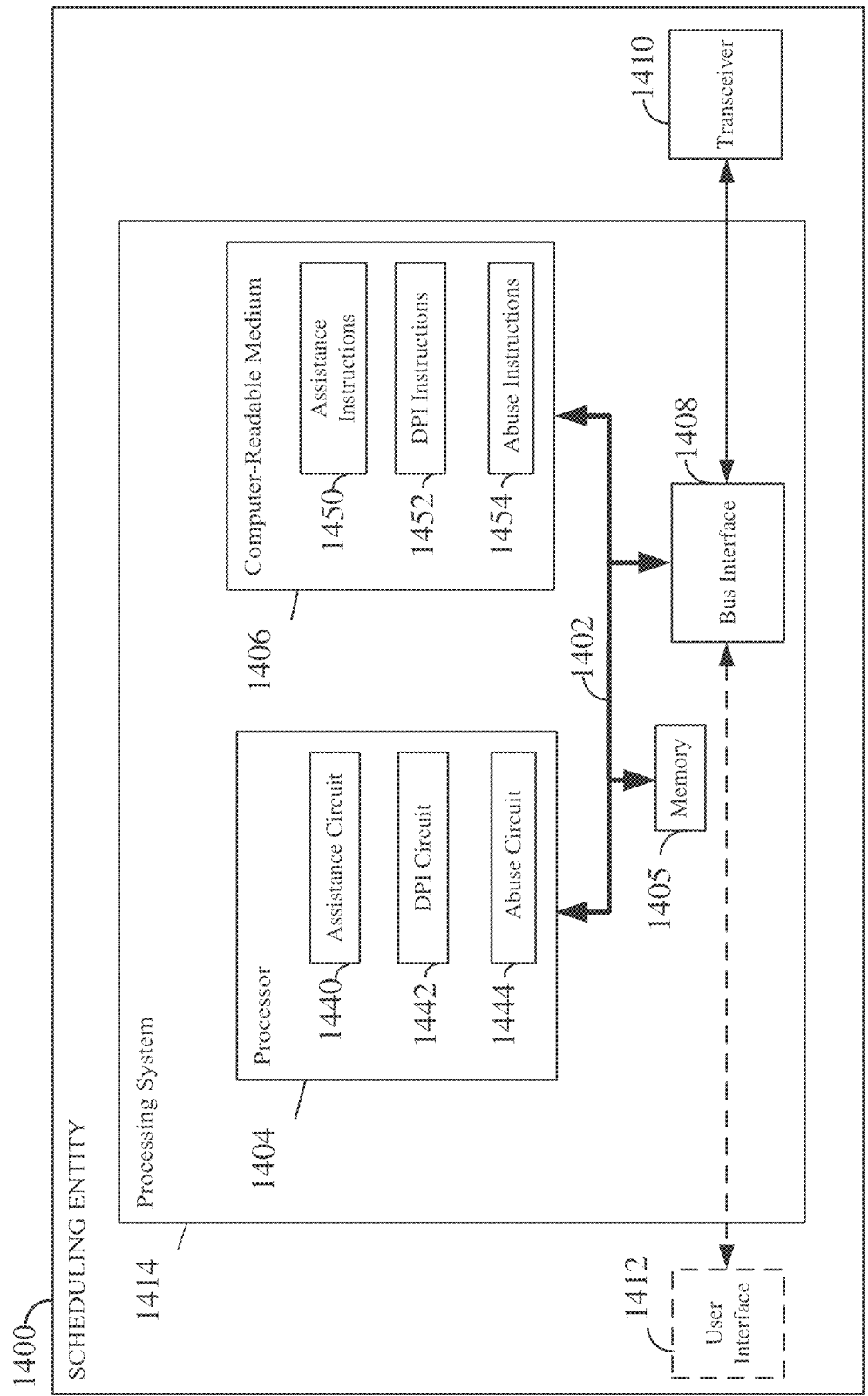
FIG. 14 is a block diagram conceptually illustrating an example of a hardware implementation for a base station according to some aspects of the disclosure.

FIG. 14 is a block diagram illustrating an example of a hardware implementation for a scheduling entity 1400 employing a processing system 1414. For example, the scheduling entity 1400 may be a user equipment (UE) as illustrated in any one or more of FIGS. 1-5, and/or 13. In another example, the scheduling entity 1400 may be a base station as illustrated in any one or more of FIGS. 1-5, 13, and/or 15.

The scheduling entity 1400 may be implemented with a processing system 1414 that includes one or more processors 1404. Examples of processors 1404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1400 may be configured to perform any one or more of the functions described herein. That is, the processor 1404, as utilized in a scheduling entity 1400, may be used to implement any one or more of the processes and procedures described above in relation to FIG. 13, and below in relation to FIGS. 16 and 17.

In this example, the processing system 1414 may be implemented with a bus architecture, represented generally by the bus 1402. The bus 1402 may include any number of interconnecting buses and bridges depending on the specific application of the processing system 1414 and the overall design constraints. The bus 1402 communicatively couples together various circuits including one or more processors (represented generally by the processor 1404), a memory 1405, and computer-readable media (represented generally by the computer-readable medium 1406). The bus 1402 may also link various other circuits such as timing sources, peripherals, voltage regulators, and power management circuits, which are well known in the art, and therefore, will not be described any further. A bus interface 1408 provides an interface between the bus 1402 and a transceiver 1410. The transceiver 1410 provides a communication interface or means for communicating with various other apparatus over a transmission medium. Depending upon the nature of the apparatus, a user interface 1412 (e.g., keypad, display, speaker, microphone, joystick) may also be provided. Of course, such a user interface 1412 is optional, and may be omitted in some examples, such as a base station.

In some aspects of the disclosure, the processor 1404 may include assistance circuitry 1440 configured for various functions, including, for example, receiving configuration information from OAM to support the assisted local caching feature. The configuration information may be received via retrieval from the memory 1405 of the scheduling entity 1400, or it may be received by the transceiver 1410 in a wireless communication with another network entity. The received configuration information may be stored in the memory 1405. The received configuration information may update or modify the scheduling entity 1400 to allow for certain control plane signaling between the UE 106 and the scheduling entity 1400. For example, the configuration information may include a lookup table having entries corresponding to assistance information (AI) that may be provided by the UE 106. In this example, the scheduling entity 1400 may receive a communication from the UE 106 via the transceiver 1410, wherein the communication includes AI. The scheduling entity 1400 may use the stored lookup table entries to interpret the AI and determine a response. The control plane signaling may facilitate coordination and communication of local caching features available to both the UE 106 and the scheduling entity 1400.

The assistance circuitry 1440 may also support configuring a UE 106 so that it can effectively communicate local cache packet routing information to the scheduling entity 1400. In one example, the scheduling entity 1400 may receive a communication via the transceiver 1410 from the UE 106 indicating that the UE 106 can support packet assisted routing. Upon receiving the communication, the scheduling entity 1400 may optionally determine if the UE 106 is eligible for packet assisted routing. In the case that either the UE 106 passes the eligibility check or the scheduling entity 1400 does not perform an eligibility check, the scheduling entity 1400 may configure the UE 106 to use the packet acceleration feature by communicating an updated RRCConnectionReconfiguration message via the transceiver 1410. If the scheduling entity 1400 does not support assisted packet routing, or if the UE 106 is not eligible, then the scheduling entity 1400 may ignore the UE 106 capability information and/or AI associated with a received communication.

The assistance circuitry 1440 may further operate in coordination with assistance software 1450. In one example, the assistance circuitry 1440 may be configured to implement one or more of the functions described below in relation to described above in relation to FIG. 13, and below in relation to FIGS. 16 and 17.

In some aspects of the disclosure, the processor 1404 may include DPI circuitry 1442 configured for various functions, including, for example, deep packet inspection of packets received from the UE 106. In one example, if the UE 106 does not support packet assisted routing, the scheduling entity 1400 may perform DPI on packets it receives from the UE 106 using the DPI circuitry. Similarly, if the scheduling entity 1400 does not support packet assisted routing, the scheduling entity 1400 may ignore AI in received packets, and perform DPI instead. The DPI circuitry 1442 may further operate in coordination with DPI software 1452. In one example, the DPI circuitry 1442 may be configured to implement one or more of the functions described below in relation to described above in relation to FIG. 13, and below in relation to FIGS. 16 and 17.

In some aspects of the disclosure, the processor 1404 may include abuse circuitry 1444 configured for various functions, including, for example, determination of eligibility of the UE 106. For example, the abuse circuitry 1444 may determine whether AI received in a communication from the UE 106 is consistent with an ACPL of the UE 106. In one example, after receiving the AI from the UE 106, the scheduling entity 1400 may determine if the UE 106 is eligible for the requested acceleration. The scheduling entity 1400 may check the ACPL associated with the UE 106 to determine eligibility. If the received AI is consistent with the ACPL information, then the scheduling entity 1400 may determine that the UE 106 is eligible for the feature associated with the AI. The scheduling entity 1400 may then process any AI consistent with the ACPL information that the UE may provide in the user-plane solutions described above. The scheduling entity 1400 may store the ACPL information associated with the UE 106 in the memory 1405 to enable rapid reference and determination of additional AI that the scheduling entity 1400 may receive. If the UE 106 is not eligible for the feature associated with the AI, or if the scheduling entity 1400 does not support the feature, then the scheduling entity 1400 may ignore the AI, and may simply route the packet to the CN. The abuse circuitry 1444 may further operate in coordination with abuse software 1454. In one example, the abuse circuitry 1444 may be configured to implement one or more of the functions described below in relation to described above in relation to FIG. 13, and below in relation to FIGS. 16 and 17.

The processor 1404 is responsible for managing the bus 1402 and general processing, including the execution of software stored on the computer-readable medium 1406. The software, when executed by the processor 1404, causes the processing system 1414 to perform the various functions described below for any particular apparatus. The computer-readable medium 1406 and the memory 1405 may also be used for storing data that is manipulated by the processor 1404 when executing software.

One or more processors 1404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1406. The computer-readable medium 1406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1406 may reside in the processing system 1414, external to the processing system 1414, or distributed across multiple entities including the processing system 1414. The computer-readable medium 1406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1406 may include assistance software 1450 configured for various functions, including, for example, instructions for receiving configuration information from OAM to support assisted local cache packet routing information communicated via the control plane and/or the user plane. The assistance software 1450 may also support configuring a UE 106 so that it can effectively communicate local cache packet routing information to the scheduling entity 1400. The assistance software 1450 may also support updating or modifying the scheduling entity 1400 to allow for certain control plane signaling between the UE 106 and the scheduling entity 1400. For example, the assistance software 1450 may be configured to implement one or more of the functions described above in relation to FIG. 13, and below in relation to FIGS. 16 and 17.

In one or more examples, the computer-readable storage medium 1406 may include DPI software 1452 configured for various functions, including, for example, deep packet inspection of packets received from the UE. For example, the DPI software 1452 may be configured to implement one or more of the functions described above in relation to FIG. 13, and below in relation to FIGS. 16 and 17.

In one or more examples, the computer-readable storage medium 1406 may include abuse software 1454 configured for various functions, including, for example, determination of eligibility of the UE 106. The abuse software 1454 may support a determination of whether AI provided by the UE 106 is consistent with the ACPL of the UE 106. For example, the abuse software 1454 may support a determination of whether AI received in a communication from the UE 106 is consistent with an ACPL of that UE 106. For example, the abuse software 1454 may be configured to implement one or more of the functions described above in relation to FIG. 13, and below in relation to FIGS. 16 and 17.

Scheduled Entity

Figure 15:
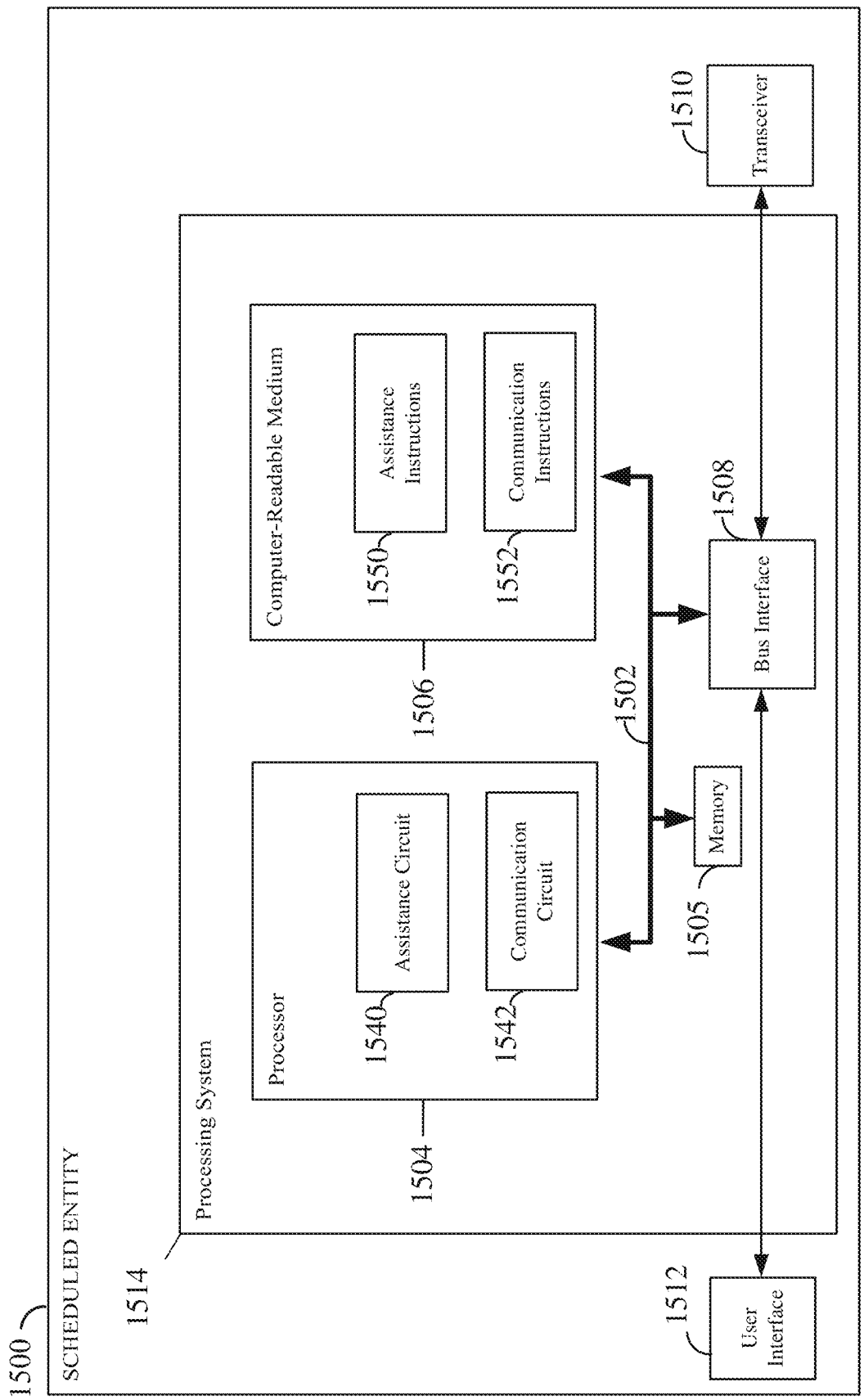
FIG. 15 is a block diagram conceptually illustrating an example of a hardware implementation for a UE according to some aspects of the disclosure.

FIG. 15 is a conceptual diagram illustrating an example of a hardware implementation for an exemplary scheduled entity 1500 employing a processing system 1514. In accordance with various aspects of the disclosure, an element, or any portion of an element, or any combination of elements may be implemented with a processing system 1514 that includes one or more processors 1504. For example, the scheduled entity 1500 may be a user equipment (UE) as illustrated in any one or more of FIGS. 1-5, and/or 13.

The processing system 1514 may be substantially the same as the processing system 1414 illustrated in FIG. 14, including a bus interface 1508, a bus 1502, memory 1505, a processor 1504, and a computer-readable medium 1506. Furthermore, the scheduled entity 1500 may include a user interface 1512 and a transceiver 1510 substantially similar to those described above in FIG. 14. That is, the processor 1504, as utilized in a scheduled entity 1500, may be used to implement any one or more of the processes described below and illustrated in FIGS. 13 and 18.

In some aspects of the disclosure, the processor 1504 may include assistance circuitry 1540 configured for various functions, including, for example, receiving a communication, via the transceiver 1510, from a scheduling entity 1400, wherein the communication is configured to notify the scheduled entity 1500 of the scheduling entity's 1400 ability to handle one or more features. Upon receipt of the communication, the scheduled entity 1500 may determine to transmit, via the transceiver 1510, information related to the scheduled entity's 1500 AI capability to the scheduling entity 1400. The assistance circuitry 1540 may also support receiving, via the transceiver 1510, configuration information from the scheduling entity 1400 to support the assisted local caching feature by routing packet information communicated via the control plane and/or the user plane. The assistance circuitry 1540 may also support generation and communication of UL packets according to the user plane solutions and control plane solutions disclosed herein.

In some aspects of the disclosure, the processor 1504 may include communication circuitry 1542 configured for various functions, including, for example, receiving a communication, via the transceiver 1510, from a scheduling entity 1400. The communication circuitry 1542 may also support transmitting, via a transceiver 1510, data containing AI. The communication circuit 1542 may also be configured to transmit, via the transceiver 1510, information related to the scheduled entity's 1500 AI capability to the scheduling entity 1400. The communication circuitry 1542 may also support receiving, via the transceiver 1510, configuration information from the scheduling entity 1400. For example, the communication circuitry 1542 may be configured to implement one or more of the functions described above in relation to FIG. 13, including, elements 1306, 1308, and 1312, and below in relation to FIG. 18.

The processor 1504 is responsible for managing the bus 1502 and general processing, including the execution of software stored on the computer-readable medium 1506. The software, when executed by the processor 1504, causes the processing system 1514 to perform the various functions described below for any particular apparatus. The computer-readable medium 1506 and the memory 1505 may also be used for storing data that is manipulated by the processor 1504 when executing software.

One or more processors 1504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1506. The computer-readable medium 1506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1506 may reside in the processing system 1514, external to the processing system 1514, or distributed across multiple entities including the processing system 1514. The computer-readable medium 1506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1506 may include assistance software 1550 configured for various functions, including, for example, receiving a communication, via the transceiver 1510, from a scheduling entity 1400, wherein the communication is configured to notify the scheduled entity 1500 of the scheduling entity's 1400 ability to handle one or more features. Upon receipt of the communication, the scheduled entity 1500 may determine to transmit, via the transceiver 1510, information related to the scheduled entity's 1500 AI capability to the scheduling entity 1400. The assistance software 1550 may also support receiving, via the transceiver 1510, configuration information from the scheduling entity 1400 to support the assisted local caching feature by routing packet information communicated via the control plane and/or the user plane. The assistance software 1550 may also support generation and communication of UL packets according to the user plane solutions and control plane solutions disclosed herein.

The assistance software 1550 may also support transmitting, via a transceiver 1510, data containing AI. The AI may be configured to indicate packet assisted routing including, for example, an acceleration indicator or related information that the scheduling entity 1400 may receive and identify as an indicator that the packet should be routed to one of the local cache 450/460 or to the CN 420. For example, the assistance software 1550 may be configured to implement one or more of the functions described above in relation to FIG. 13, including, e.g., element 1308, and below in relation to FIG. 18, including, e.g., blocks 1802, 1804, 1806, and 1808.

In one or more examples, the computer readable medium 1506 may include software 1552 configured for various functions, including, for example, receiving a communication, via the transceiver 1510, from a scheduling entity 1400. The communication software 1552 may also support transmitting, via a transceiver 1510, data containing AI. The communication software 1552 may also be configured to transmit, via the transceiver 1510, information related to the scheduled entity's 1500 AI capability to the scheduling entity 1400. The communication software 1552 may also support receiving, via the transceiver 1510, configuration information from the scheduling entity 1400. For example, the communication software 1552 may be configured to implement one or more of the functions described above in relation to FIG. 13, including, elements 1306, 1308, and 1312, and below in relation to FIG. 18, including, e.g., blocks 1802, 1804, and 1808.

Figure 16:
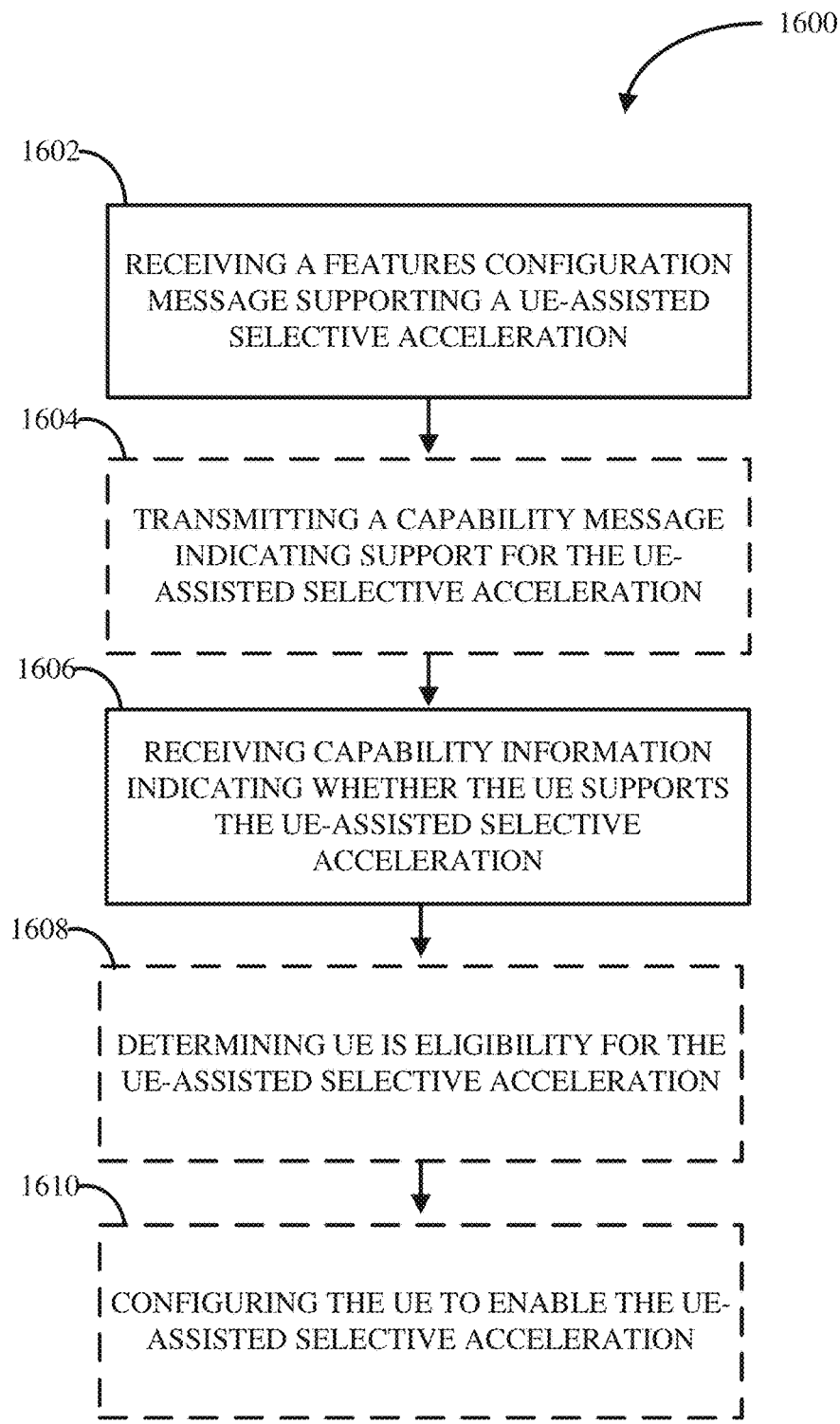
FIG. 16 is a flow chart illustrating an exemplary process for implementing the local caching capability at a base station according to some aspects of the disclosure.

FIG. 16 is a flow chart illustrating an exemplary process 1600 for user equipment assisted local cache packet routing in accordance with some aspects of the present disclosure. As described below, some or all illustrated features may be omitted in a particular implementation within the scope of the present disclosure, and some illustrated features may not be required for implementation of all aspects of the present disclosure. In some examples, the process 1600 may be carried out by the scheduling entity 1400 illustrated in FIG. 14, and/or the scheduled entity 1500 illustrated in FIG. 15. In some examples, the process 1600 may be carried out by any suitable apparatus or means for carrying out the functions or algorithm described below.

At block 1602, the scheduling entity 1400 may receive information configured to support an assisted local caching feature between the scheduling entity 1400 and the scheduled entity 1500. In one example, the scheduling entity may receive the information from OAM or from another entity, or may retrieve the information from the memory 1405. The received information may be used to configure features of the scheduling entity 1400 to include communication of the assisted local caching feature between the scheduling entity 1400 and the scheduled entity 1500. If the scheduling entity 1400 is not configured to handle the assisted local caching feature, then any acceleration or AI included in a packet received by the scheduling entity 1400 may be ignored. If the acceleration or AI is ignored, then the scheduling entity 1400 may perform DPI of one or more packets received to determine acceleration or AI.

In one example, the scheduling entity 1400 may receive the information configured to support the assisted local caching feature in response to receiving an uplink user data packet that includes a request for selective acceleration. The selective aspect of the acceleration includes service type selection may include specific cache information, such as, for example, video resolution and video rate. The service type selection may also include information regarding UE's subscription and/or characteristics of one or more network slices (e.g., broadband data rate, bandwidth, etc.). Once the scheduling entity 1400 is configured to handle user equipment assisted local cache packet routing, the scheduling entity 1400 may inspect one or more received packets, e.g., by looking at a PDCP header, a PDCP data field, and/or a MAC CE to determine whether acceleration or AI is included without performing DPI.

At block 1604, the scheduling entity 1400 may optionally notify the scheduled entity 1500 of its ability to handle user equipment assisted local cache packet routing. For example, the scheduling entity 1400 may transmit a system information block (SIB) to one or more scheduled entities 1500 notifying the network that the scheduling entity 1400 can supports the assisted local caching feature.

At block 1606, the scheduling entity 1400 may receive capability information from the scheduled entity 1500, where the capability information includes an indication that the scheduled entity 1500 supports the assisted local caching feature. The scheduling entity 1400 may receive the capability information in response to the broadcast described in block 1604.

At block 1608, the scheduling entity 1400 may optionally determine whether the scheduled entity 1500 is eligible for the assisted local caching feature. If the eligibility of the scheduled entity 1500 is not determined, then the scheduling entity 1400 may either ignore an acceleration request and AI, or may execute an acceleration request according to any AI associated with a received user data packet. If the scheduled entity 1500 is determined to not be eligible for the acceleration requested in a received packet, then the scheduling entity 1400 may either ignore an acceleration request and any associated AI, or the scheduling entity 1400 may partially accommodate the request to the extent that the scheduled entity 1500 is eligible (i.e., if the scheduled entity 1500 is eligible for a lesser degree of acceleration than what is requested).

At block 1610, the scheduling entity 1400 may configure the scheduled entity 1500 to enable effective communication of AI between the scheduling entity 1400 and the scheduled entity 1500. For example, if the scheduling entity 1400 determines that the scheduled entity 1500 has reported its capability to utilize the assisted local caching feature and is eligible for the feature, then the scheduling entity 1400 may configure the scheduled entity 1500 to engage in assisted local caching. In one example, the scheduling entity 1400 reconfigures the connection between the scheduling entity 1400 and the scheduled entity 1500. In another example, the scheduling entity 1400 provides information to the scheduled entity 1500 configured modify or adjust the format of packets sent by the scheduled entity 1500 according to the user plane disclosure herein.

Figure 17:
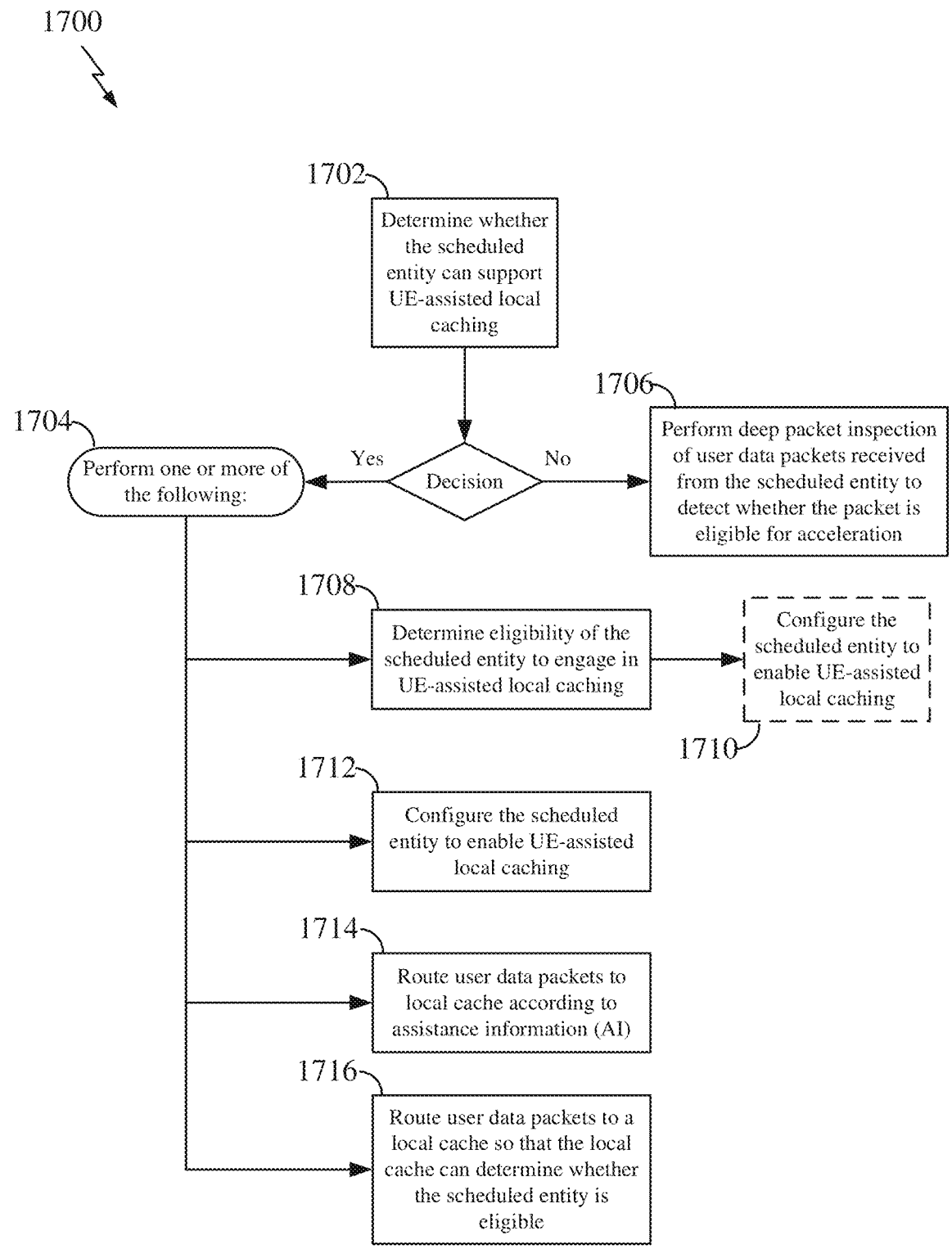
FIG. 17 is a flow chart illustrating an exemplary process for employing assisted local cache packet routing according to some aspects of the disclosure.

FIG. 17 is a flow chart illustrating an exemplary process 1700 for assisted local caching in accordance with some aspects of the present disclosure. As described below, some or all illustrated features may be omitted in a particular implementation within the scope of the present disclosure, and some illustrated features may not be required for implementation of all embodiments. In some examples, the process 1700 may be carried out by the scheduling entity 1400 illustrated in FIG. 14, and/or the scheduled entity 1500 illustrated in FIG. 15. In some examples, the process 1700 may be carried out by any suitable apparatus or means for carrying out the functions or algorithm described below.

At block 1702, the scheduling entity 1400 may determine whether a scheduled entity 1500 supports the assisted local caching feature. In one example, a scheduled entity 1500 may transmit capability information to the scheduling entity 1400 indicating that it supports this feature. If the scheduled entity 1500 can support, the process moves on to block 1704. If the scheduled entity 1500 cannot support, the process moves on to block 1706.

At block 1706, when the scheduling entity 1400 receives a user data packet from the scheduled entity 1500, the scheduling entity 1400 may perform a DPI on that user data packet to determine if the packet is eligible for acceleration.

At block 1704, the scheduling entity 1400 may perform one or more of the processes described with respect to blocks 1604, 1608, and 1610. For example, at block 1604, the scheduling entity 1400 may notify a UE of a capability to support the assisted local caching feature. At block 1608, the scheduling entity 1400 may determine whether the UE is eligible to engage in the assisted local caching feature. At block 1610 the scheduling entity 1400 may notify the UE of a capability to support the assisted local caching feature. The scheduling entity 1400 may perform other processes, including routing user data packets to local cache according to AI, and/or routing user data packets to a local cache so that the local cache can determine whether the scheduled entity is eligible.

At block 1710, the scheduling entity 1400 may optionally configure the scheduled entity 1500 to enable assisted local cache packet routing. For example, the scheduling entity 1400 may perform one or more of the processes described with respect to blocks 1608 and 1610.

At block 1712, the scheduling entity 1400 may configure the scheduled entity 1500 to enable the assisted local caching feature. For example, the scheduling entity 1400 may perform one or more of the processes described with respect to blocks 1608 and 1610.

At block 1714, when the scheduling entity 1400 receives a user data packet from the scheduled entity 1500, then the scheduling entity 1400 may route the packet to a local cache or to the CN, according to the AI that may be included in the user data packet.

At block 1716, when the scheduling entity 1400 receives a user data packet from the scheduled entity 1500, then the scheduling entity 1400 may route the packet to the local cache 450/460, so the local cache 450/460 can determine whether to store the packet data or discard it. The determination to store discard the data may be based on the eligibility of the requesting scheduled entity 1500.

In one configuration, the scheduling entity 1400 includes a means for receiving information configured to support a local cache packet routing feature between a scheduling entity and a scheduled entity 1500. The scheduling entity 1400 may include a means for configuring features of the scheduling entity 1400 to include communication of assisted local cache packet routing between the scheduling entity 1400 and a scheduled entity 1500. In one aspect, the aforementioned means may be the processor(s) 1404 shown in FIG. 14 configured to perform the functions recited by the aforementioned means. In another aspect, the aforementioned means may be the assistance circuit 1440 or any apparatus configured to perform the functions recited by the aforementioned means. In another aspect, the aforementioned means may be the transceiver 1410 or any apparatus configured to perform the functions recited by the aforementioned means.

In one configuration, the scheduling entity 1400 includes means for notifying the scheduled entity of an ability to handle the assisted local caching feature. In one aspect, the aforementioned means may be the processor(s) 1404 shown in FIG. 14 configured to perform the functions recited by the aforementioned means. In another aspect, the aforementioned means may be the assistance circuit 1440 or any apparatus configured to perform the functions recited by the aforementioned means. In another aspect, the aforementioned means may be the transceiver 1410 or any apparatus configured to perform the functions recited by the aforementioned means.

In one configuration, the scheduling entity 1400 includes means for receiving capability information indicating whether the scheduled entity 1500 supports an assisted local caching feature. In one aspect, the aforementioned means may be the processor(s) 1404 shown in FIG. 14 configured to perform the functions recited by the aforementioned means. In another aspect, the aforementioned means may be the assistance circuit 1440 or any apparatus configured to perform the functions recited by the aforementioned means. In another aspect, the aforementioned means may be the transceiver 1410 or any apparatus configured to perform the functions recited by the aforementioned means.

In one configuration, the scheduling entity 1400 includes means for determining whether the scheduled entity 1500 is eligible for an acceleration requested in a received packet. In one aspect, the aforementioned means may be the processor(s) 1404 shown in FIG. 14 configured to perform the functions recited by the aforementioned means. In another aspect, the aforementioned means may be the abuse circuit 1444 or any apparatus configured to perform the functions recited by the aforementioned means.

In one configuration, the scheduling entity 1400 includes means for configuring the scheduled entity 1500 to enable communication of AI between the scheduling entity and the scheduled entity according to the assisted local caching feature. In one aspect, the aforementioned means may be the processor(s) 1404 shown in FIG. 14 configured to perform the functions recited by the aforementioned means. In another aspect, the aforementioned means may be the assistance circuit 1440 or any apparatus configured to perform the functions recited by the aforementioned means. In another aspect, the aforementioned means may be the transceiver 1410 or any apparatus configured to perform the functions recited by the aforementioned means.

Of course, in the above examples, the circuitry included in the processor 1404 is merely provided as an example, and other means for carrying out the described functions may be included within various aspects of the present disclosure, including but not limited to the instructions stored in the computer-readable storage medium 1406, or any other suitable apparatus or means described in any one of the FIGS. 1-5, and/or 13-15, and utilizing, for example, the processes and/or algorithms described herein in relation to FIGS. 4-13, 16, and/or 17.

Figure 18:
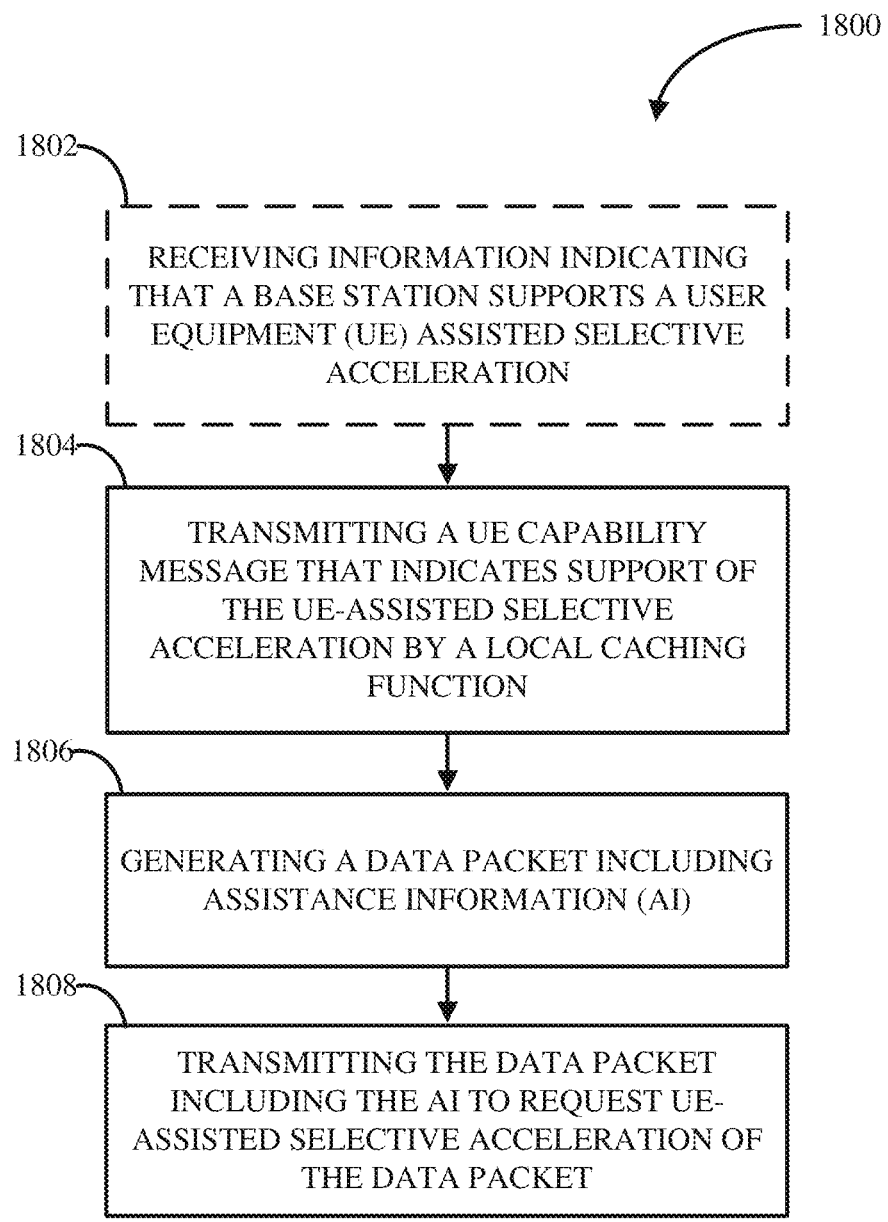
FIG. 18 is a flow chart illustrating an exemplary process for implementing the local caching capability at a UE according to some aspects of the disclosure.

FIG. 18 is a flow chart illustrating an exemplary process 1800 for user equipment assisted local cache packet routing in accordance with some aspects of the present disclosure. As described below, some or all illustrated features may be omitted in a particular implementation within the scope of the present disclosure, and some illustrated features may not be required for implementation of all aspects of the present disclosure. In some examples, the process 1800 may be carried out by the scheduled entity 1500 illustrated in FIG. 15, and/or the scheduling entity 1400 illustrated in FIG. 14. In some examples, the process 1800 may be carried out by any suitable apparatus or means for carrying out the functions or algorithm described below.

At block 1802, the scheduled entity 1500 may receive a communication indicating a local caching capability of a base station or scheduling entity 1400. In one example, the scheduled entity 1500 may receive the receive the information via a transceiver 1510 and store the information in a memory 1505. The received communication may include information configured to notify the scheduled entity 1500 of an assisted local caching feature of the scheduling entity 1400. The communication may indicate the extent which the scheduling entity 1400 is capable of accommodating an acceleration request. For example, the communication may include information indicating a degree of acceleration for which the scheduling entity 1400 is capable. The scheduled entity 1500 may compare the information provided in the communication to its own requirements to determine whether the scheduling entity's 1400 capability is suitable.

At block 1804, the scheduled entity 1500 may optionally notify the scheduling entity 1400 of its local caching capability. For example, the scheduled entity 1500 may transmit a message via the transceiver 1510 that contains information indicative of the scheduled entity's 1500 local caching capability, a user plane data configuration, and/or a data plane data configuration. In one example, the notification may be an acknowledgment/negative-acknowledgement (ACK/NACK) message in response to the received communication from the base station.

At block 1806, the scheduled entity 1500 may generate AI for an uplink packet, wherein the AI is configured to indicate packet treatment. For example, the scheduled entity 1500 may request acceleration or redirection to local caching of the uplink packet by including the AI in the uplink packet. Generation of the AI may be accomplished using the processing system 1514, and more particularly, the assistance circuit 1540.

At block 1808, the scheduled entity 1500 may transmit the uplink packet containing the AI via the transceiver 1510.

In one configuration, the scheduled entity 1500 includes means for receiving a communication indicating a local caching capability of a base station or scheduling entity 1400. In one aspect, the aforementioned means may be the processor(s) 1504 shown in FIG. 15 configured to perform the functions recited by the aforementioned means. In another aspect, the aforementioned means may be one or more of the assistance circuit 1540, the communication circuit 1542, or any apparatus configured to perform the functions recited by the aforementioned means. In another aspect, the aforementioned means may be the transceiver 1510 or any apparatus configured to perform the functions recited by the aforementioned means.

In one configuration, the scheduled entity 1500 includes means for notifying the scheduling entity 1400 of its local caching capability. In one aspect, the aforementioned means may be the processor(s) 1504 shown in FIG. 15 configured to perform the functions recited by the aforementioned means. In another aspect, the aforementioned means may be one or more of the assistance circuit 1540, the communication circuit 1542, or any apparatus configured to perform the functions recited by the aforementioned means. In another aspect, the aforementioned means may be the transceiver 1510 or any apparatus configured to perform the functions recited by the aforementioned means.

In one configuration, the scheduled entity 1500 includes means for generating AI for an uplink packet, wherein the AI is configured to indicate packet treatment. In one aspect, the aforementioned means may be the processor(s) 1504 shown in FIG. 15 configured to perform the functions recited by the aforementioned means. In another aspect, the aforementioned means may be one or more of the assistance circuit 1540, the communication circuit 1542, or any apparatus configured to perform the functions recited by the aforementioned means.

In one configuration, the scheduled entity 1500 includes means for transmitting the uplink packet containing the AI via the transceiver 1510. In one aspect, the aforementioned means may be the processor(s) 1504 shown in FIG. 15 configured to perform the functions recited by the aforementioned means. In another aspect, the aforementioned means may be one or more of the assistance circuit 1540, the communication circuit 1542, or any apparatus configured to perform the functions recited by the aforementioned means. In another aspect, the aforementioned means may be the transceiver 1510 or any apparatus configured to perform the functions recited by the aforementioned means.

Of course, in the above examples, the circuitry included in the processor 1504 is merely provided as an example, and other means for carrying out the described functions may be included within various aspects of the present disclosure, including but not limited to the instructions stored in the computer-readable storage medium 1506, or any other suitable apparatus or means described in any one of the FIGS. 1-5, and/or 13-15, and utilizing, for example, the processes and/or algorithms described herein in relation to FIGS. 4-13 and/or 18.

Additional Considerations

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-18 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-18 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication operable at a user equipment (UE), the method comprising:
   transmitting, to a base station, a UE capability message indicative of whether the UE supports a UE-assisted selective acceleration by local caching; and
   transmitting, to the base station, a data packet including assistance information (AI) to request the UE-assisted selective acceleration of the data packet by the local caching and to indicate to the base station to forgo performing deep packet inspection (DPI) of the data packet, wherein data responsive to the request is stored in a local cache in response to selective acceleration based on an indication included in the AI.

2. The method of claim 1, further comprising receiving a configuration message, wherein the configuration message configures the UE to include the AI in the data packet to request the UE-assisted selective acceleration of the data packet.

3. The method of claim 1, further comprising receiving a system information block (SIB) from a base station indicating that the base station supports the UE-assisted selective acceleration.

4. The method of claim 1, wherein the AI comprises at least one of an acceleration indication or a service type, and wherein the AI is included in at least one of:
(i) a reserved bit of a header field of a packet data convergence protocol (PDCP) protocol data unit (PDU),
(ii) a first field positioned after the header field of the PDCP PDU, or
(iii) a media access control (MAC) control element (CE) of the data packet.

5. The method of claim 4, wherein the AI is included in a plurality of reserved bits in the header field of the PDCP PDU.

6. The method of claim 4, wherein the AI comprises the acceleration indication or the service type in an authorized content provider list (ACPL).

7. The method of claim 1, wherein the AI is indicative of a request to route the data packet to a local cache at a base station.

8. An apparatus configured for wireless communication, comprising:
a memory device;
a transceiver; and
at least one processor communicatively coupled to the memory device and the transceiver, configured to:
transmit, to a base station, a user equipment (UE) capability message indicative of whether a UE supports a UE-assisted selective acceleration by local caching; and
transmit, to the base station, a data packet including assistance information (AI) to request the UE-assisted selective acceleration of the data packet by the local caching and to indicate to the base station to forgo performing deep packet inspection (DPI) of the data packet, wherein data responsive to the request is stored in a local cache in response to selective acceleration based on an indication included in the AI.

9. The apparatus of claim 8, wherein the at least one processor is further configured to receive a configuration message, wherein the configuration message configures the UE to include the AI in the data packet to request the UE-assisted selective acceleration of the data packet.

10. The apparatus of claim 8, wherein the at least one processor is further configured to receive a system information block (SIB) from a base station indicating that the base station supports the UE-assisted selective acceleration.

11. The apparatus of claim 8, wherein the AI comprises at least one of an acceleration indication or a service type, and wherein the AI is included in at least one of:

(i) a reserved bit of a header field of a packet data convergence protocol (PDCP) protocol data unit (PDU),
(ii) a first field positioned after the header field of the PDCP PDU, or
(iii) a media access control (MAC) control element (CE) of the data packet.

12. The apparatus of claim 11, wherein the AI is included in a plurality of reserved bits in the header field of the PDCP PDU.

13. The apparatus of claim 11, wherein the AI comprises the acceleration indication or the service type in an authorized content provider list (ACPL).

14. The apparatus of claim 8, wherein the AI is indicative of a request to route the data packet to a local cache at a base station.

15. A method of wireless communication operable at a base station, the method comprising:
receiving a capability message from a user equipment (UE), wherein the capability message indicates support of a UE-assisted selective acceleration using a local cache;
receiving a data packet from the UE, wherein the data packet includes assistance information (AI) requesting UE-assisted selective acceleration of the data packet and indicating to the base station to forgo performing deep packet inspection (DPI) of the data packet, wherein data responsive to the request is stored in a local cache in response to selective acceleration based on an indication included in the AI; and
routing the data packet to the local cache or to a core network, according to the AI.

16. The method of claim 15, further comprising transmitting a configuration message for configuring the UE to include the AI in the data packet, wherein transmitting the configuration message is in response to the UE capability message.

17. The method of claim 15, further comprising broadcasting a system information block (SIB) indicating support of the UE-assisted selective acceleration.

18. The method of claim 15, further comprising receiving a features configuration message from an operation and maintenance (OAM) node in response to receiving the data packet including the AI.

19. The method of claim 15, further comprising routing, according to the AI, the data packet to the local cache for determination of whether the AI is consistent with an authorized content provider list (ACPL) corresponding to a subscription of the UE.

20. The method of claim 15, wherein the AI includes at least one of:
(i) a reserved bit of a header field of a packet data convergence protocol (PDCP) protocol data unit (PDU),
(ii) a first field positioned after the header field of the PDCP PDU, or
(iii) a media access control (MAC) control element (CE) of the data packet.

21. The method of claim 15, further comprising determining UE eligibility for the UE-assisted selective acceleration requested by the AI.

22. The method of claim 21, further comprising performing a the DPI of the data packet if: (i) the UE is not authorized to utilize the requested UE-assisted selective acceleration, (ii) the base station does not support the requested UE-assisted selective acceleration, or (iii) the base station does not support recognition of the AI.

23. An apparatus for wireless communication, comprising:
- a memory device;
- a transceiver; and
- at least one processor communicatively coupled to the memory device and the transceiver, configured to:
  - receive a capability message from a user equipment (UE), wherein the capability message indicates support of a UE-assisted selective acceleration using a local cache;
  - receive a data packet from the UE, wherein the data packet includes assistance information (AI) requesting UE-assisted selective acceleration of the data packet and indicating to the apparatus to forgo performing deep packet inspection (DPI) of the data packet, wherein data responsive to the request is stored in a local cache in response to selective acceleration based on an indication included in the AI; and
  - route the data packet to the local cache or to a core network, according to the AI.

24. The apparatus of claim 23, wherein the at least one processor is further configured to transmit a configuration message for configuring the UE to include the AI in the data packet, wherein transmitting the configuration message is in response to the UE capability message.

25. The apparatus of claim 23, wherein the at least one processor is further configured to broadcast a system information block (SIB) indicating support of the UE-assisted selective acceleration.

26. The apparatus of claim 23, wherein the at least one processor is further configured to receive a features configuration message from an operation and maintenance (OAM) node in response to receiving the data packet including the AI.

27. The apparatus of claim 23, wherein the at least one processor is further configured to route, according to the AI, the data packet to the local cache for determination of whether the AI is consistent with an authorized content provider list (ACPL) corresponding to a subscription of the UE.

28. The apparatus of claim 23, wherein the AI includes at least one of:
  (i) a reserved bit of a header field of a packet data convergence protocol (PDCP) protocol data unit (PDU),
  (ii) a first field positioned after the header field of the PDCP PDU, or
  (iii) a media access control (MAC) control element (CE) of the data packet.

29. The apparatus of claim 23, wherein the at least one processor is further configured to determine UE eligibility for the UE-assisted selective acceleration requested by the AI.

30. The apparatus of claim 29, wherein the at least one processor is further configured to perform the DPI of the data packet if: (i) the UE is not authorized to utilize the requested UE-assisted selective acceleration, (ii) the apparatus does not support the requested UE-assisted selective acceleration, or (iii) the apparatus does not support recognition of the AI.

* * * * *